US00RE40218E

(19) United States
(12) Reissued Patent
Landau

(10) Patent Number: US RE40,218 E
(45) Date of Reissued Patent: Apr. 8, 2008

(54) ELECTRO-CHEMICAL DEPOSITION SYSTEM AND METHOD OF ELECTROPLATING ON SUBSTRATES

(76) Inventor: Uziel Landau, 13909 Larchmere Blvd., Shaker Heights, OH (US) 44120

(21) Appl. No.: 10/622,001

(22) Filed: Jul. 17, 2003

Related U.S. Patent Documents

Reissue of:
(64) Patent No.: 6,261,433
Issued: Jul. 17, 2001
Appl. No.: 09/295,678
Filed: Apr. 21, 1999

U.S. Applications:
(60) Provisional application No. 60/082,521, filed on Apr. 21, 1998.

(51) Int. Cl.
*C25D 5/00* (2006.01)

(52) U.S. Cl. ..... 205/96; 205/103; 205/123; 205/128; 205/149; 205/153; 205/157; 204/297.01; 204/297.03; 204/230.2; 204/230.7; 204/260; 204/261; 204/263; 204/272; 204/273; 204/275.1

(58) Field of Classification Search ..... None
See application file for complete search history.

(56) References Cited

U.S. PATENT DOCUMENTS

| | | | | |
|---|---|---|---|---|
| 2,882,209 A | | 4/1959 | Brown et al. | |
| 3,649,509 A | * | 3/1972 | Morawetz et al. | 204/238 |
| 3,727,620 A | * | 4/1973 | Orr | 134/95.2 |
| 3,770,598 A | * | 11/1973 | Creutz | 205/296 |
| 4,027,686 A | * | 6/1977 | Shortes et al. | 134/33 |
| 4,092,176 A | * | 5/1978 | Kozai et al. | 134/186 |
| 4,110,176 A | * | 8/1978 | Creutz et al. | 205/296 |
| 4,113,492 A | * | 9/1978 | Sato et al. | 430/271.1 |
| 4,120,711 A | | 10/1978 | Gudeman | |
| 4,120,771 A | | 10/1978 | Dewallens | |
| 4,304,641 A | | 12/1981 | Grandia et al. | 204/23 |
| 4,315,059 A | * | 2/1982 | Raistrick et al. | 429/112 |
| 4,326,940 A | * | 4/1982 | Eckles et al. | 204/232 |
| 4,336,114 A | * | 6/1982 | Mayer et al. | 205/298 |

(Continued)

FOREIGN PATENT DOCUMENTS

| | | |
|---|---|---|
| JP | 58-182823 | * 10/1983 |
| JP | 63-118093 | * 5/1988 |

(Continued)

OTHER PUBLICATIONS

PCT Written Opinion citing additional references for PCT/US99/28159, dated Dec. 8, 2000.*

(Continued)

*Primary Examiner*—Bruce F. Bell
(74) *Attorney, Agent, or Firm*—Patterson & Sheridan, LLP

(57) ABSTRACT

The invention provides an apparatus and a method for achieving reliable, consistent metal electroplating or electrochemical deposition onto semiconductor substrates. More particularly, the invention provides uniform and void-free deposition of metal onto metal seeded semiconductor substrates having sub-micron, high aspect ratio features. The invention provides an electrochemical deposition cell comprising a substrate holder, a cathode electrically contacting a substrate plating surface, an electrolyte container having an electrolyte inlet, an electrolyte outlet and an opening adapted to receive a substrate plating surface and an anode electrically connect to an electrolyte. Preferably, a vibrator is attached to the substrate holder to vibrate the substrate in at least one direction, and an auxiliary electrode is disposed adjacent the electrolyte outlet to provide uniform deposition across the substrate surface. Preferably, a periodic reverse current is applied during the plating period to provide a void-free metal layer within high aspect ratio features on the substrate.

43 Claims, 7 Drawing Sheets

U.S. PATENT DOCUMENTS 4,376,685 A * 3/1983 Watson ..... 205/298
4,405,416 A * 9/1983 Raistrick et al. ..... 205/407
4,428,815 A * 1/1984 Powell et al. ..... 204/297.03
4,435,266 A * 3/1984 Johnston ..... 204/276
4,489,740 A * 12/1984 Rattan et al. ..... 134/140
4,510,176 A * 4/1985 Cuthbert et al. ..... 438/780
4,518,678 A * 5/1985 Allen ..... 430/311
4,519,846 A * 5/1985 Aigo ..... 134/15
4,693,805 A * 9/1987 Quazi ..... 204/192.22
4,732,785 A * 3/1988 Brewer ..... 438/748
4,789,445 A * 12/1988 Goffman et al. ..... 205/335
5,039,381 A * 8/1991 Mullarkey ..... 205/103
5,055,425 A * 10/1991 Leibovitz et al. ..... 216/15
5,092,975 A * 3/1992 Yamamura et al. ..... 204/198
5,155,336 A * 10/1992 Gronet et al. ..... 219/411
5,162,260 A * 11/1992 Leibovitz et al. ..... 216/18
5,168,887 A 12/1992 Thompson et al. ..... 134/153
5,222,310 A * 6/1993 Thompson et al. ..... 34/202
5,224,504 A * 7/1993 Thompson et al. ..... 134/155
5,230,743 A * 7/1993 Thompson et al. ..... 134/32
5,252,807 A * 10/1993 Chizinsky ..... 219/390
5,256,274 A * 10/1993 Poris ..... 205/123
5,259,407 A * 11/1993 Tuchida et al. ..... 134/151
5,290,361 A * 3/1994 Hayashida et al. ..... 134/2
5,302,256 A 4/1994 Miura et al. ..... 205/85
5,316,974 A * 5/1994 Crank ..... 438/643
5,328,589 A * 7/1994 Martin ..... 205/296
5,349,978 A * 9/1994 Sago et al. ..... 134/153
5,368,711 A * 11/1994 Poris ..... 204/193
5,377,708 A * 1/1995 Bergman et al. ..... 134/105
5,429,733 A * 7/1995 Ishida ..... 204/224 R
5,447,615 A * 9/1995 Ishida ..... 204/224 R
5,512,163 A 4/1996 Warfield
5,516,412 A * 5/1996 Andricacos et al. .... 204/224 R
5,544,421 A 8/1996 Thompson et al. ..... 34/58
5,605,615 A 2/1997 Goolsby et al.
5,605,866 A 2/1997 McClanahan et al. ..... 437/225
5,608,943 A * 3/1997 Konishi et al. ..... 15/302
5,620,581 A 4/1997 Ang ..... 205/96
5,625,170 A * 4/1997 Poris ..... 177/50
5,651,865 A * 7/1997 Sellers ..... 204/192.13
5,664,337 A 9/1997 Davis et al. ..... 34/58
5,678,320 A 10/1997 Thompson et al. ..... 34/58
5,705,223 A * 1/1998 Bunkofske ..... 427/240
5,718,813 A * 2/1998 Drummond et al. ... 204/192.12
5,723,028 A * 3/1998 Poris ..... 204/230.7
5,744,019 A 4/1998 Ang
5,762,751 A 6/1998 Bleck et al. ..... 156/345
5,788,454 A 8/1998 Thompson et al. ..... 414/786
5,882,168 A 3/1999 Thompson et al. ..... 414/416
5,972,192 A 10/1999 Dubin et al. ..... 205/101
5,980,706 A 11/1999 Bleck et al. ..... 204/297 R
5,985,126 A 11/1999 Bleck et al. ..... 205/123
6,001,234 A 12/1999 Batz, Jr. et al. ..... 205/123
6,004,440 A 12/1999 Hanson et al.
6,004,828 A 12/1999 Hanson ..... 438/7
6,024,857 A 2/2000 Reid ..... 205/123
6,027,631 A 2/2000 Broadbent
6,074,544 A 6/2000 Reid et al.
6,090,711 A 7/2000 Batz, Jr. et al. ..... 438/689
6,091,498 A 7/2000 Hanson et al. ..... 356/375
6,099,712 A 8/2000 Ritzdorf et al. ..... 205/123
6,110,346 A 8/2000 Reid et al.
6,126,798 A 10/2000 Reid et al. ..... 204/282
6,132,857 A 10/2000 Champenois et al. .... 428/300.7
6,139,703 A 10/2000 Hanson et al.
6,139,712 A 10/2000 Patton et al.
6,156,167 A 12/2000 Patton et al.
6,159,354 A 12/2000 Contolini et al. ..... 205/96
6,162,344 A 12/2000 Reid et al.
6,168,693 B1 1/2001 Uzoh et al.
6,174,425 B1 1/2001 Simpson et al.
6,179,983 B1 1/2001 Reid et al. ..... 205/96
6,197,181 B1 3/2001 Chen ..... 205/123
6,203,582 B1 3/2001 Berner et al. ..... 29/25.01
6,228,231 B1 5/2001 Uzoh ..... 204/224 R
6,270,647 B1 8/2001 Graham et al.
6,280,581 B1 8/2001 Cheng
6,322,674 B1 11/2001 Berner et al.
6,322,678 B1 11/2001 Woodruff et al.
6,343,793 B1 2/2002 Patton et al.
6,344,125 B1 2/2002 Locke et al.
6,391,166 B1 5/2002 Wang ..... 204/224 R
6,436,249 B1 8/2002 Patton et al.
6,444,101 B1 9/2002 Stevens et al.
6,454,926 B1 9/2002 Ritzdorf et al.
6,500,316 B1 12/2002 Fatula, Jr. et al.
6,500,317 B1 12/2002 Yoshioka et al.
6,517,689 B1 2/2003 Hongo et al.
6,527,926 B2 3/2003 Woodruff et al.
6,547,937 B1 4/2003 Oberlitner et al.
6,551,483 B1 4/2003 Mayer et al.
6,562,204 B1 5/2003 Mayer et al.
6,589,401 B1 7/2003 Patton et al.
6,627,051 B2 9/2003 Berner et al.
6,627,052 B2 9/2003 Fluegel et al.
6,693,417 B2 2/2004 Wilson
6,761,812 B2 7/2004 Preusse et al.
6,783,657 B2 8/2004 Marsh et al.
6,802,946 B2 10/2004 Basol et al.
6,843,894 B2 1/2005 Berner et al.
6,849,167 B2 2/2005 Woodruff et al.
6,908,540 B2 6/2005 Kholodenko
6,921,468 B2 7/2005 Graham et al.
7,025,862 B2 4/2006 Herchen et al.
7,087,144 B2 8/2006 Herchen
2002/0022363 A1 * 2/2002 Ritzdorf et al. ..... 438/672
2005/0051436 A1 3/2005 Chen et al.

FOREIGN PATENT DOCUMENTS

JP 04131395 * 5/1992
JP 04280993 * 10/1992
JP 6017291 * 1/1994
JP 407014811 1/1995
WO WO 97/12079 * 4/1997
WO WO 99/16936 4/1999
WO WO 99/25902 * 5/1999
WO WO 99/25903 * 5/1999
WO WO 99/25904 * 5/1999
WO WO 99/25905 * 5/1999
WO WO 99/26275 * 5/1999
WO WO 00/32835 6/2000
WO WO 02/04715 1/2002

OTHER PUBLICATIONS

PCT International Search Report dated Feb. 7, 2000.*

Kenneth E. Pitney, "Ney Contact Manual," Electrical Contacts for Low Energy Uses, 1973, no month available.*

Lucio Colombo, "Wafer Back Surface Film Removal," Central R&D, SGS–Thompson, Microelectronics, Agrate, Italy, 6 pages, no month available.*

Semitool, Inc., "Metallization & Interconnect," 1998, 4 pages, no month available.*

Verteq Online, "Products Overview," 1996–1998, 5 pages, no month available.*

Laurell Technologies Corporation, "Two control configurations available—see WS 400 or WS–400 Lite." Oct. 19, 1998, 6 pages.*

Peter Singer, "Tantalum, Copper and Damascene: The Future of Interconnects," Semiconductor International, Jun. 1998, pages cover, 91–91, 94, 96 & 98.*
Peter Singer, "Wafer Processing," Semiconductor International, Jun., 1998, p. 70.*
PCT Notification of Transmittal of International Preliminary Examination Report dated Apr. 13, 2007 for PCT/US01/31943.
PCT International Search Report dated Jul. 5, 2005, for PCT/US01/31943.
PCT International Search Report dated Jul. 5, 2005, for PCT/US01/20622.
PCT Written Opinion for International Application No. PCT/US01/20624 dated Aug. 8, 2006.

* cited by examiner

ELECTRO-CHEMICAL DEPOSITION SYSTEM AND METHOD OF ELECTROPLATING ON SUBSTRATES

Matter enclosed in heavy brackets [ ] appears in the original patent but forms no part of this reissue specification; matter printed in italics indicates the additions made by reissue.

CROSS REFERENCE TO RELATED APPLICATION

This application claims the benefit of U.S. Provisional Application Ser. No. 60/082,521, entitled "Electroplating on Substrates," filed on Apr. 21, 1998.

BACKGROUND OF THE INVENTION

1. Field of the Invention

The present invention generally relates to deposition of a metal layer onto a substrate. More particularly, the present invention relates to an apparatus and a method for electroplating a metal layer onto a substrate.

2. Background of the Related Art

Sub-micron multi-level metallization is one of the key technologies for the next generation of ultra large scale integration (ULSI). The multilevel interconnects that lie at the heart of this technology require planarization of interconnect features formed in high aspect ratio apertures, including contacts, vias, lines and other features. Reliable formation of these interconnect features is very important to the success of ULSI and to the continued effort to increase circuit density and quality on individual substrates and die.

As circuit densities increases, the widths of vias, contacts and other features, as well as the dielectric materials between them, decrease to sub-micron dimensions, whereas the thickness of the dielectric layers remains substantially constant, with the result that the aspect ratios for the features, i.e., their height divided by width, increases. Many traditional deposition processes have difficulty filling sub-micron structures where the aspect ratio exceed 2:1, and particularly where it exceeds 4:1. Therefore, there is a great amount of ongoing effort being directed at the formation of void-free, sub-micron features having high aspect ratios.

Elemental aluminum (Al) and its alloys have been the traditional metals used to form lines and plugs in semiconductor processing because of aluminum's low electrical resistivity, its superior adhesion to silicon dioxide ($SiO_2$), its ease of patterning, and the ability to obtain it in a highly pure form. However, aluminum has a higher electrical resistivity than other more conductive metals such as copper and silver, and aluminum also can suffer from electromigration phenomena. Electromigration is considered as the motion of atoms of a metal conductor in response to the passage of high current density through it, and it is a phenomenon that occurs in a metal circuit while the circuit is in operation, as opposed to a failure occurring during fabrication. Electromigration can lead to the formation of voids in the conductor. A void may accumulate and/or grow to a size where the immediate cross-section of the conductor is insufficient to support the quantity of current passing through the conductor, and may also lead to an open circuit. The area of conductor available to conduct heat therealong likewise decreases where the void forms, increasing the risk of conductor failure. This problem is sometimes overcome by doping aluminum with copper and with tight texture or crystalline structure control of the material. However, electromigration in aluminum becomes increasingly problematic as the current density increases.

Copper and its alloys have lower resistivity than aluminum and higher electromigration resistance as compared to aluminum. These characteristics are important for supporting the higher current densities experienced at high levels of integration and increased device speed. Copper also has good thermal conductivity and is available in a highly pure state. Therefore, copper is becoming a choice metal for filling sub-micron, high aspect ratio interconnect features on semiconductor substrates.

Despite the desirability of using copper for semiconductor device fabrication, choices of fabrication methods for depositing copper into high aspect ratio features are limited. Precursors for CVD deposition of copper are ill-developed and involve complex and costly chemistry. Physical vapor deposition into such features produces unsatisfactory results because of limitations in 'step coverage' and voids formed in the features.

As a result of these process limitations, electroplating, which had previously been limited to the fabrication of patterns on circuit boards, is just now emerging as a method to fill vias and contacts on semiconductor devices. FIGS. 1A-1E illustrate a metallization technique for forming a dual damascene interconnect in a dielectric layer having dual damascene via and wire definition, wherein the via has a floor exposing an underlying layer. Although a dual damascene structure is illustrated, this method can be applied also to metallize other interconnect features. The method generally comprises physical vapor depositing a barrier layer over the feature surfaces, physical vapor depositing a conductive metal seed layer, preferably copper, over the barrier layer, and then electroplating a conductive metal over the seed layer to fill the structure/feature. Finally, the deposited layers and the dielectric layers are planarized, such as by chemical mechanical polishing (CMP), to define a conductive interconnect feature.

Referring to FIGS. 1A through 1E, a cross sectional diagram of a layered structure 10 is shown including a dielectric layer 16 formed over an underlying layer 14 which contains electrically conductive features 15. The underlying layer 14 may take the form of a doped silicon substrate or it may be a first or subsequent conducting layer formed on a substrate. The dielectric layer 16 is formed over the underlying layer 14 in accordance with procedures known in the art such as dielectric CVD to form a part of the overall integrated circuit. Once deposited, the dielectric layer 16 is patterned and etched to form a dual damascene via and wire definition, wherein the via has a floor 30 exposing a small portion of the conducting feature 15. Etching of the dielectric layer 16 can be accomplished with various generally known dielectric etching processes, including plasma etching.

Referring to FIG. 1A, a cross-sectional diagram of a dual damascene via and wire definition formed in the dielectric layer 16 is shown. The via and wire definition facilitates the deposition of a conductive interconnect that will provide an electrical connection with the underlying conductive feature 15. The definition provides vias 32 having via walls 34 and a floor 30 exposing at least a portion of the conductive feature 15, and trenches 17 having trench walls 38.

Referring to FIG. 1B, a barrier layer 20 of tantalum or tantalum nitride (TaN) is deposited on the via and wire definition, such that aperture 18 remains in the via 32, by using reactive physical vapor deposition, i.e., by sputtering a tantalum target in a nitrogen/argon plasma. Preferably, where the aspect ratio of the aperture is high (e.g. 4:1 or higher) with a sub-micron wide via, the Ta/TaN is deposited in a high density plasma environment, wherein the sputtered deposition of the Ta/TaN is ionized and drawn perpendicularly to the substrate by a negative bias on the substrate. The barrier layer is preferably formed of tantalum or tantalum nitride, however other barrier layers such as titanium, titanium nitride and combinations thereof may also be used. The process used may be PVD, CVD, or combined CVD/PVD for texture and film property improvement. The barrier layer limits the diffusion of copper into the semiconductor substrate and the dielectric layer and thereby dramatically increases the reliability of the interconnect. It is preferred that the barrier layer has a thickness between about 25 Å and about 400 Å, most preferably about 100 Å.

Referring to FIG. 1C, a PVD copper seed layer 21 is deposited over the barrier layer 20. Other metals, particularly noble metals, can also be used for the seed layer. The PVD copper seed layer 21 provides good adhesion for subsequently deposited metal layers, as well as a conformal layer for even growth of the copper thereover.

Referring to FIG. 1D, a copper layer 22 is electroplated over the PVD copper seed layer 21 to completely fill the via 32 with a copper plug 19.

Referring to FIG. 1E, the top portion of the structure 10, i.e., the exposed copper is then planarized, preferably by chemical mechanical polishing (CMP). During the planarization process, portions of the copper layer 22, copper seed layer 21, barrier layer 20, and dielectric layer 16 are removed from the top surface of the structure, leaving a fully planar surface with conductive interconnect 39.

Metal electroplating in general is a well-known art and can be achieved by a variety of techniques. Common designs of cells for electroplating a metal on wafer-based substrates involve a fountain configuration. The substrate is positioned with the plating surface at a fixed distance above a cylindrical electrolyte container, and the electrolyte impinges perpendicularly on the substrate plating surface. The substrate is the cathode of the plating system, such that ions in the plating solution deposit on the conductive exposed surface of the substrate and the micro-sites on the substrate. However, a number of obstacles impair consistent reliable electroplating of copper onto substrates having a sub-micron scale, high aspect ratio features. Generally, these obstacles involve difficulty with providing uniform current density distribution across the substrate plating surface, which is needed to form a metal layer having uniform thickness. A primary obstacle is how to get current to the substrate and how to ensure that the current is uniformly distributed thereon.

One current method for providing power to the plating surface uses contacts (e.g., pins, 'fingers', or springs) which contact the substrate seed layer. The contacts touch the seed layer as close as practically possible to the edge of the substrate, to minimize the wasted area on the wafer due to the presence of the contacts. The 'excluded' area can no longer be used to ultimately form devices on the substrate. However, the contact resistance of the contacts to the seed layer may vary from contact to contact, resulting in a non-uniform distribution of current densities across the substrate. Also, the contact resistance at the contract to seed layer interface may vary from substrate to substrate, resulting in inconsistent plating distribution between different substrates using the same equipment. Furthermore, the plating rate tends to be higher near the region of the contacts and be lower at regions remote from the contacts due to the resistivity of the thin seed layer that has been deposited on the substrate. A fringing effect of the electrical field also occurs at the edge of the substrate due to the highly localized electrical field formed at the edge of the plated region, causing a higher deposition rate near the edge of the substrate.

A resistive substrate effect is usually pronounced during the initial phase of the electroplating process and reduces the deposition uniformity because the seed layer and the electroplated layers on the substrate deposition surface are typically thin. The metal plating tends to concentrate near the current feed contacts, i.e., the plating rate is greatest adjacent the contacts, because the current density across the substrate decreases as the distance from the current feed contacts increases due to insufficient conductive material on the seed layer to provide a uniform current density across the substrate plating surface. As the deposition film layer becomes thicker due to the plating, the resistive substrate effect diminishes because a sufficient thickness of deposited material becomes available across the substrate plating surface to provide uniform current densities across the substrate. It is desirable to reduce the resistive substrate effect during electroplating.

Traditional fountain plater designs also provide non-uniform flow of the electrolyte across the substrate plating surface, which compounds the effects of the non-uniform current distribution on the plating surface by providing non-uniform replenishment of plating ions and where applicable, plating additives, across the substrate, resulting in non-uniform plating. The electrolyte flow uniformity across the substrate can be improved by rotating the substrate at a high rate during the plating process. Such rotation introduces complexity into the plating cell design due to the need to furnish current across and revolving interface. However, the plating uniformity still deteriorates at the boundaries or edges of the substrate because of the fringing effects of the electrical field near the edge of the substrate, the seed layer resistance and the potentially variable contact resistance.

There is also a problem in maintaining an electroplating solution to the system having consistent properties over the duration of a plating cycle and/or over a run of multiple wafers being plated. Traditional fountain plater designs generally require continual replenishing of the metal being deposited into the electrolyte. The metal electrolyte replenishing scheme is difficult to control and causes build-up of co-ions in the electrolyte, resulting in difficult to control variations in the ions concentration in the electrolyte. Thus, the electroplating process produces inconsistent results because of inconsistent ion concentration in the electrolyte.

Additionally, operation of a plating cell incorporating a non-consumable anode may cause bubble-related problems because oxygen evolves on the anode during the electroplating process. Bubble-related problems include plating defects caused by bubbles that reach the substrate plating surface and prevent adequate electrolyte contact with the plating surface. It is desirable to eliminate or reduce bubble formation from the system and to remove formed bubbles from the system.

Therefore, there remains a need for a reliable, consistent metal electroplating apparatus and method to deposit uniform, high quality metal layers on substrates to form sub-micron features. There is also a need to form metal layers on substrates having micron-sized, high aspect ratio features to fill the features without voids in the features.

SUMMARY OF THE INVENTION

The invention provides an apparatus and a method for achieving reliable, consistent metal electroplating or electrochemical deposition onto substrates. More particularly, the invention provides uniform and void-free deposition of metal onto substrates having sub-micron features formed thereon and a metal seed layer formed thereover. The invention provides an electro-chemical deposition cell comprising a substrate holder, a cathode electrically contacting a substrate plating surface, an electrolyte container having an electrolyte inlet, an electrolyte outlet and an opening adapted to receive a substrate and an anode electrically connect to an electrolyte. The configuration and dimensions of the deposition cell and its components are designed to provide uniform current distribution across the substrate. The cell is equipped with a flow-through anode and a diaphragm unit that provide a combination of relatively uniform flow of particular-free electrolyte in an easy to maintain configuration. Additionally, an agitation device may be mounted to the substrate holder to vibrate the substrate in one or more directions, ie., x, y and/or z directions. Still further, an auxiliary electrode can be disposed adjacent the electrolyte outlet to provide uniform deposition across the substrate surface and to shape as necessary the electrical field at the edge of the substrate and at the contacts. Still further, time variable current waveforms including periodic reverse and pulsed current can be applied during the plating period to provide a void-free metal layer within sub-micron features on the substrate.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides several embodiments of a new electrochemical cell and a method of operation of the cells to deposit high quality metal layers on substrates. The invention also provides new electrolyte solutions which can be used to advantage in the deposition of metals, and copper in particular, into very small features, i.e., micron sized features and smaller. The invention will be described below first in reference to the hardware, then operation of the hardware and then chemistry of the electrolyte solutions.

Electrochemical Cell Hardware

Figure 1A:
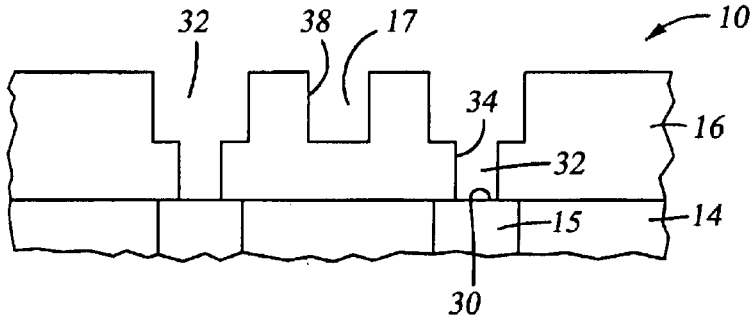
Fig. 1A (PRIOR ART)
FIGS. 1A-1E are cross sectional views of a dual damascene interconnect in a *dielectric* layer illustrating a metallization technique for forming such interconnect.
Figure 1B:
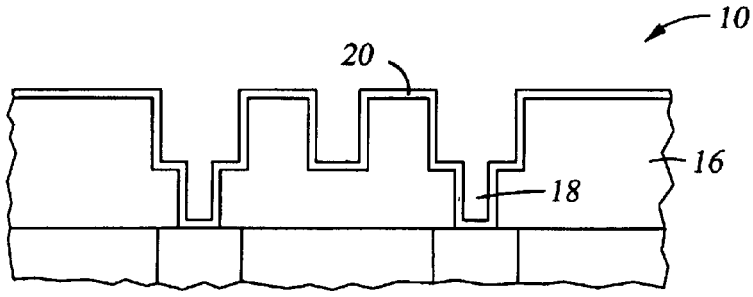
Fig. 1B (PRIOR ART)
Figure 1C:
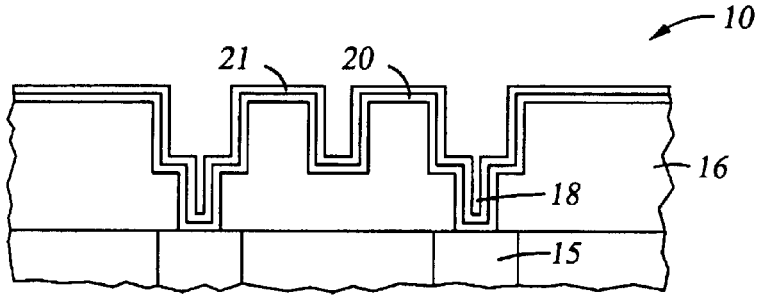
Fig. 1C (PRIOR ART)
Figure 1D:
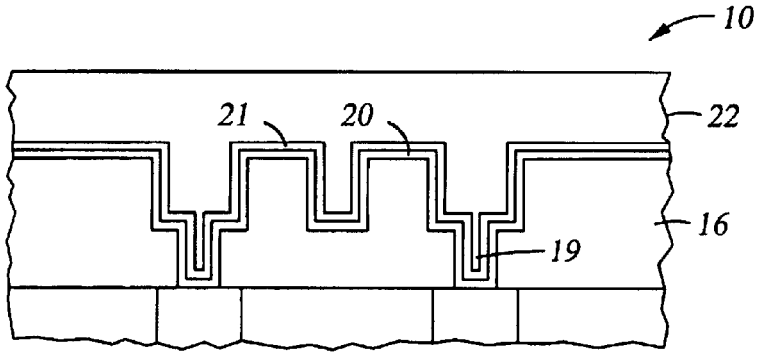
Fig. 1D (PRIOR ART)
Figure 1E:
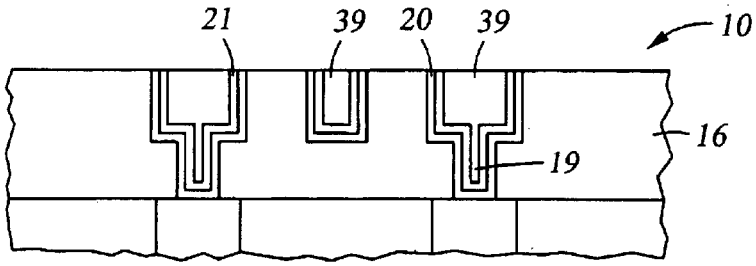
Fig. 1E (PRIOR ART)
Figure 2:
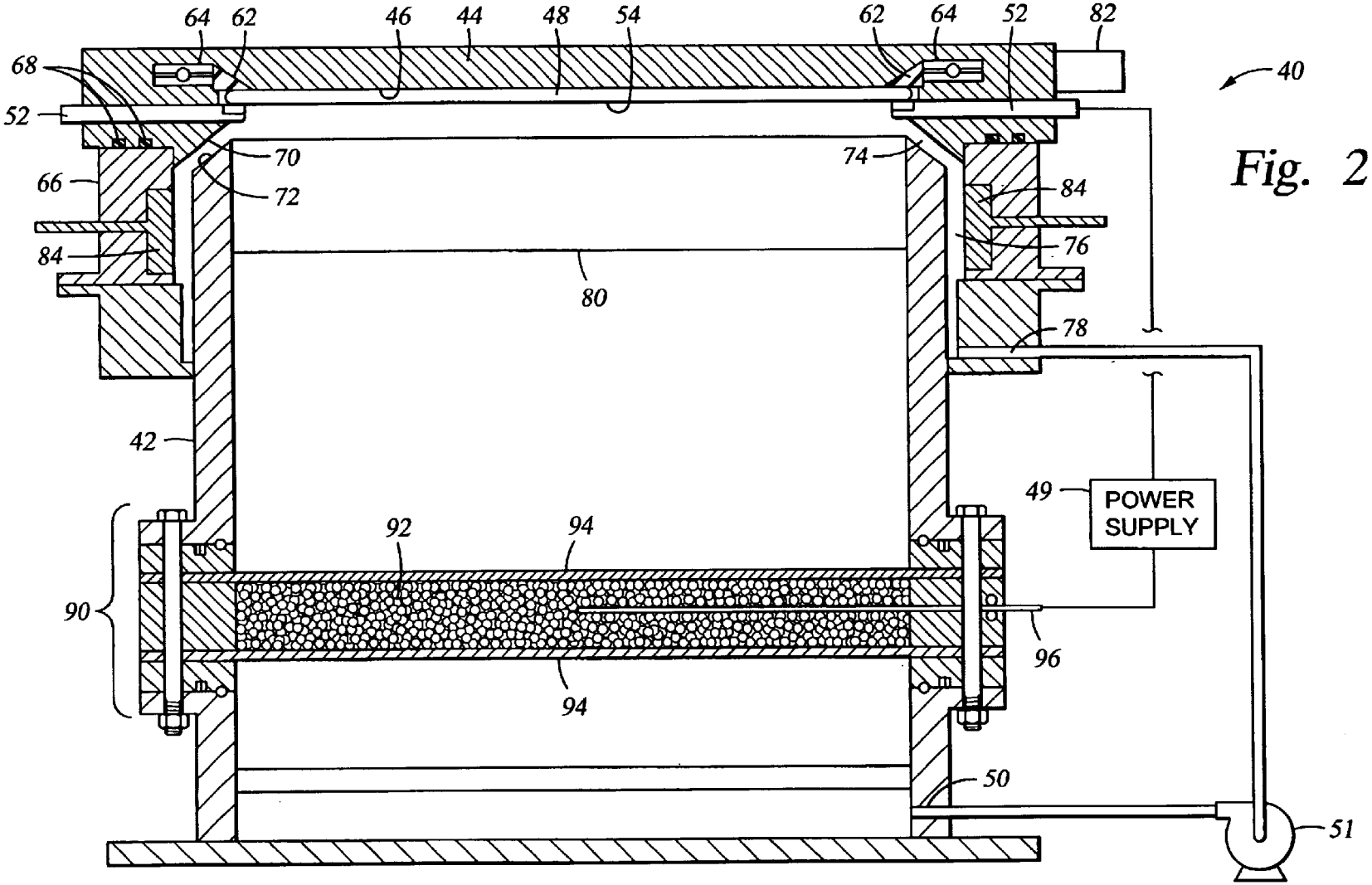
FIG. 2 is a partial vertical cross sectional schematic view of a cell for electroplating a metal onto semiconductor substrates.

FIG. 2 is a cross sectional schematic view of a cell 40 for electroplating a metal onto a substrate. The electroplating cell 40 generally comprises a container body 42 having an opening on the top portion of the container body to receive and support a substrate holder 44 thereover. The container body 42 is preferably an annular cell comprised of an electrically insulative material, such a plastic, plexiglass (acrylic), lexane, PVC, CPVC, and PVDF. Alternatively, the container body can be made from a metal, such as stainless steel, nickel or titanium which is coated with an insulating layer, e.g., Teflon®, PVDF, plastic or rubber, or other combinations of materials which can be electrically insulated from the electrodes (ie., the anode and the cathode) of the cell and which do not dissolve in the electrolyte. The substrate holder 44 serves as a top cover for the container body and has a substrate supporting surface 46 disposed on the lower surface thereof. The container body 42 is preferably sized and adapted to conform to the shape of the substrate 48 being processed, typically square, rectangular or circular in shape and to the size of the plated region thereon.

An electroplating solution inlet 50 is disposed at the bottom portion of the container body 42. The electroplating solution is pumped into the container body 42 by a suitable pump 51 connected to the inlet 50 and flows upwardly inside the container body 42 toward the substrate 48 to contact the exposed substrate surface 54.

Figure 3:
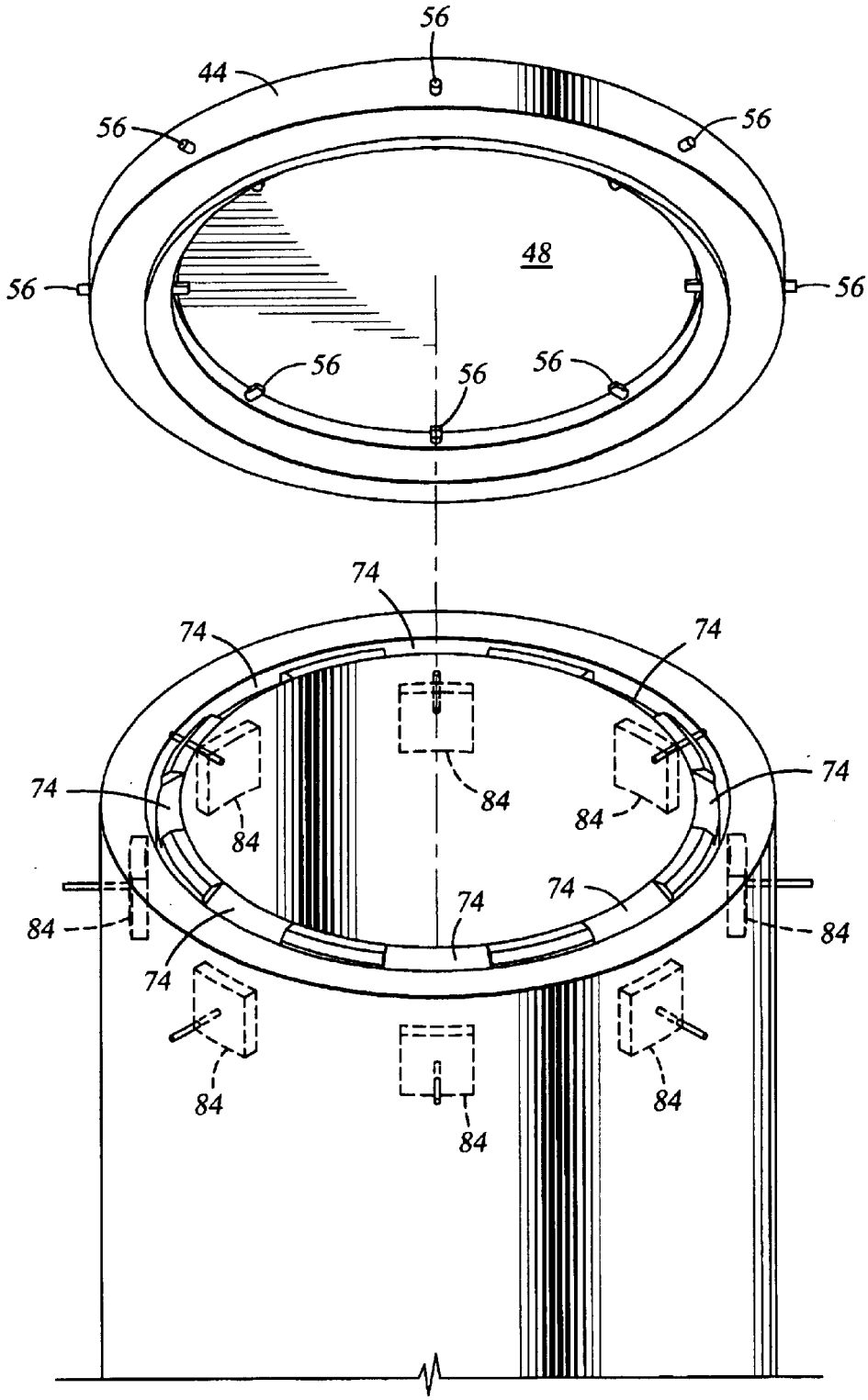
FIG. 3 is a schematic top view of a cathode contact member comprising a radial array of contact pins disposed about the circumference of the substrate and the cell body showing one arrangement of auxiliary electrodes.

The substrate 48 is secured on the substrate supporting surface 46 of the substrate holder 44, preferably by a plurality of passages in the surface 46 maintainable at vacuum to form a vacuum chuck (not shown). A cathode contact member 52 is disposed on the lower surface of the substrate holder 44 and supports a substrate over the container. The cathode contact member 52 includes one or more contacts which provide electrical connection between a power supply 49 and a substrate 48. The cathode contact member 52 may comprise a continuous conductive ring or wire or a plurality of conductive contact fingers or wires 56 (Shown in FIG. 3) in electrical contact with the substrate plating surface 54. FIG. 3 is an exploded perspective view of a substrate holder 44 having a cathode contact member comprising a radial array of contact pins 56 disposed about the circumference of the substrate. The contact pins 56 (eight shown) extend radially inwardly over the edge of the substrate 48 and contact a conductive layer on the substrate 48 at the tips of the contact pins 56, thereby providing good electrical contact to the substrate plating surface 54. Also, the radial array of contact pins present a negligible barrier to the flow of the electrolyte, resulting in minimal electrolyte flow distrubance near the plating surface of the substrate. Alternatively, the cathode contact member may contact the edge of the substrate in a continuous ring or semi-continuous ring (i.e., a segmented ring).

The cathode contact member 52 provides electrical current to the substrate plating surface 54 to enable the electroplating process and therefore is preferably comprised of a metallic or semi-metallic conductor. The contact member 52 may also include a non-plating or insulative coating to prevent plating on surfaces that are exposed to the electrolyte on the contact member. Plating on the cathode contact member may change the current and potential distributions adjacent to the contact member and is likely to lead to defects on the wafer. The non-plating or insulation coating material can comprise of a polymeric coating, such as Teflon®, PVDF, PVC, rubber or an appropriate elastomer. Alternatively, the contact member may be made of a metal that resists being coated by copper, such as tantalum (Ta), tantalum nitride (TaN), titanium nitride (TiN), titanium (Ti), or aluminum. The coating material prevents plating onto the contact and ensures predictable conduction characteristics through the contact to the surface of the substrate. If the contact members are made of metals that are stable in the chemical environment of the cell but may be coated with copper throughout the plating process, such as platinum, gold, and/or their alloys, the contact member is preferably protected by an insulative sheet, an elastomer gasket or coating. The contacts preferably provide low contact resistance to the substrate surface or are coated, particularly in the contact region with a material that provides low contact resistance to the substrate surface. Examples include copper or platinum. Plating on the contact region of the cathode contact member 52 may change the physical and chemical characteristics of the conductor and may eventually deteriorate the contact performance, resulting in plating variations or defects. Hence, the contact region is preferably insulated from the electrolyte by a surrounding insulating ring, sleeve, gasket or coating disposed on the contact member outside the region where the contact physically contacts the substrate. Examples of such coatings include PVDF, PVC, Teflon®, rubbers or other appropriate elastomer. If the contact member becomes plated, an anodic current may be passed through the contacts periodically for a brief time to deplate the contact member. The cathode for this rejuvenation process may be either the regular anode (reverse biased) or the auxiliary electrodes described later.

Figure 4:
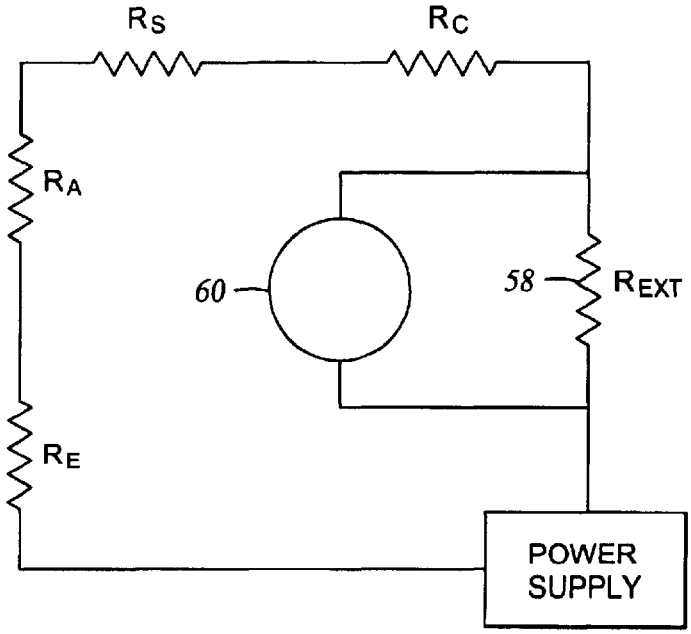
FIG. 4 is a schematic diagram of the electrical circuit representing the electroplating system through each contact pin and resistors.

Typically, one power supply is connected to all of the contact pins of the cathode contact member, resulting in parallel circuits through the contact pins. As the pin-to-substrate interface resistance varies, between pin locations, more current will flow, and thus more plating will occur, at the site of lowest resistance. However, by placing an external resistor in series with each contact pin, the value or quantity of electrical current passed through each contact pin becomes controlled mainly by the value of the external resistor, because the overall resistance of each contact pin-substrate contact plus the control resistor branch of the power supply to substrate circuit is substantially equal to that of the control resistor. As a result, the variations in the electrical properties between each contact pin do not affect the current distribution on the substrate, and a uniform current density results across the plating surface which contributes to uniform plating thickness. To provide, a uniform current distribution between each of the contact pins 56 of the radial array configuration of cathode contact member 52, both during the plating cycle on a single substrate and between substrates in a plating run of multiple substrates, an external resistor 58 is connected in series with each contact pin 56. FIG. 4 is a schematic diagram of the electrical circuit representing the electroplating system through each contact pin of the cathode contact member 52 and the external resistor 58 connected in series with each contact pin 56. Preferably, the resistance value of the external resistor ($RE_{EXT}$) 58 is greater than the resistance of any other resistive component of the circuit. As shown in FIG. 4, the electrical circuit through each contact pin 56 is represented by the resistance of each of the components connected in series with the power supply. $R_E$ represents the resistance of the electrolyte, which is typically dependent on the distance between the anode and the cathode and the composition of the electrolyte solution. $R_A$ represents the resistance of the electrolyte adjacent the substrate plating surface within the double layer and the boundary layer. $R_S$ represents the resistance of the substrate plating surface, and $R_C$ represents the resistance of the cathode contacts 56. Preferably, the resistance value of the external resistor ($R_{EXT}$) is greater than the total of $R_E$, $R_A$, $R_S$ and $R_C$, e.g., >1 Ω and preferably >5 Ω. The external resistor 58 also provides a uniform current distribution between different substrates of a process-sequence.

As each substrate is plated, and over multiple substrate plating cycles, the contact-pin-substrate interface resistance still may vary, eventually reaching an unacceptable value. An electronic sensor/alarm 60 can be connected across the external resistor 58 to monitor the voltage/current across the external resistor to address this problem. If the voltage/current across any external resistor 58 falls outside of a preset operating range that is indicative of a high pin-substrate resistance, the sensor/alarm 60 triggers corrective measures such as shutting down the plating process until the problems are corrected by an operator. Alternatively, a separate power supply can be connected to each contact pin and can be separately controlled and monitored to provide a uniform current distribution across the substrate.

Figure 2A:
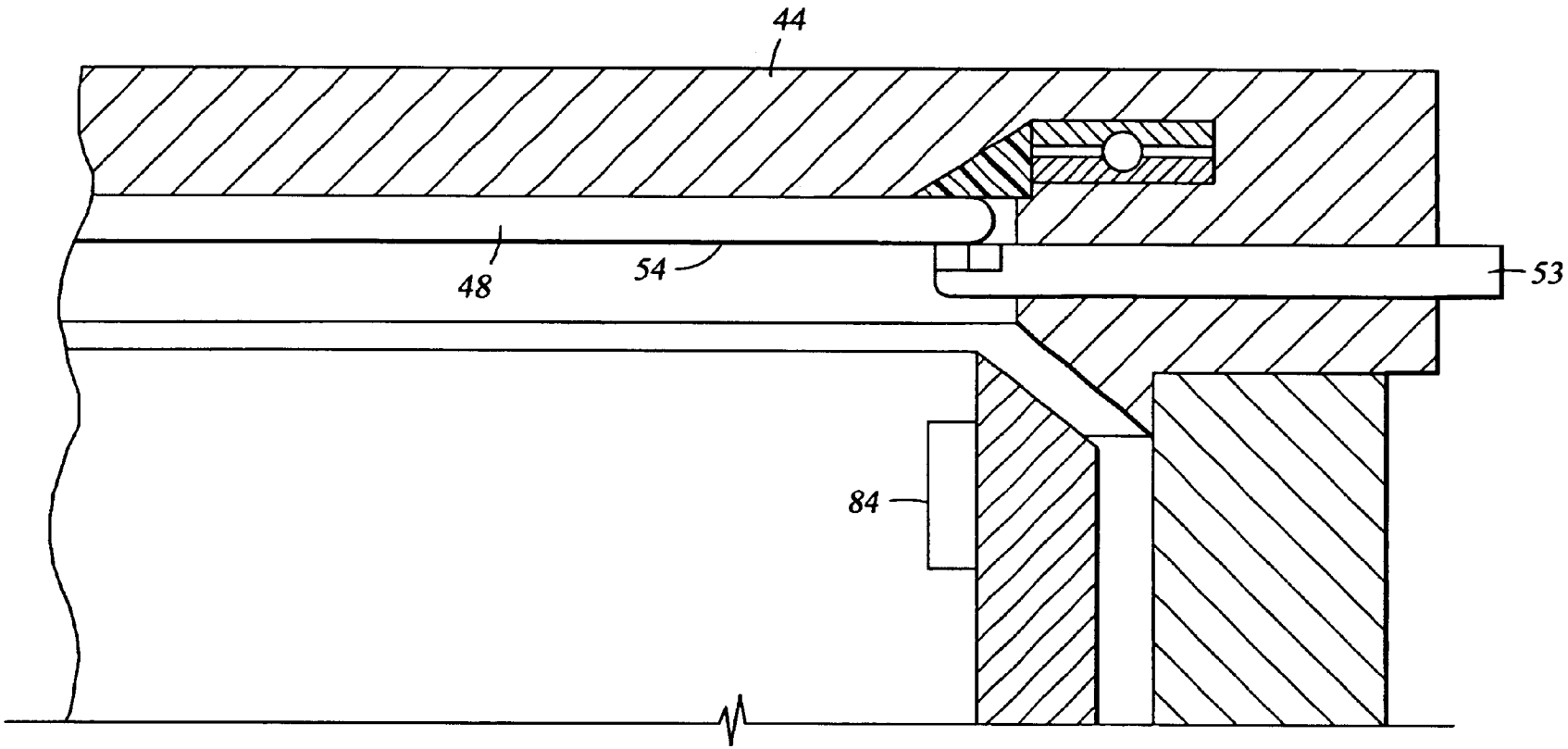
FIG. 2a is a partial cross sectional view of a continuous ring cathode member in contact with a substrate on a substrate holder.

An alternative to the contact pin arrangement is a cathode contact member 52 comprising a continuous ring that contacts the peripheral edge of the substrate. FIG. 2a is a partial cross sectional view of a continuous ring cathode member 53 in contact with a substrate 48 disposed in a substrate holder 44. The continuous ring cathode member 52 maximizes the cathode contact with the substrate plating surface 54 and minimizes the current distribution non-uniformity by eliminating the problems of individual contact pins.

Referring again to FIG. 2, the backside of the wafer must be sealed to prevent the migration of plating or electrolyte solution to the backside of the substrate. In one embodiment, where the substrate is held on by a vacuum chuck in the substrate holder and the substrate must be loaded against the cathode contact member 52, an elastomer (e.g., silicone rubber) ring 62 is disposed partially within the substrate holder 44 to seal the backside of the substrate 48 from the electroplating solution and to enhance loading of the substrate 48 against the cathode contact member 52. The elastomer ring 62 shown in FIG. 2 is a wedge-shaped ring, although other shapes can also be used effectively. The resiliency of the elastomer ring, when compressed by the substrate, forces the substrate into good electrical contact with the cathode contact member 52 and provides a good seal for the backside of the substrate 48.

Optionally, the substrate holder 44 may include a gas inflated bladder 64 disposed adjacent the elastomer ring 62 to enhance the seal created by the elastomer ring 62 and improve the electrical contact between the cathode contact member 52 and the substrate plating surface 54. The gas inflated bladder 64 is disposed in an annular cavity adjacent the elastomer ring 62 and can be inflated by a gas to exert pressure on the elastomer ring 62 and urge the substrate to exert pressure on the elastomer ring 62 and urge the substrate into contact with the contact member 52. To relieve the contact pressure between the elastomer ring 62 and the backside of the substrate 48, a relief valve deflates the gas inflated bladder 64 to allow the elastomer ring 62 to retract into the substrate holder 44.

The substrate holder 44 is positioned above the container body 42 so that the substrate plating surface 54 of a substrate faces the opening of the container body 42. The substrate holder 44 is disposed on an outer ring 66 that is connected to the top portion of container body 42. An insulating O-ring 68 is disposed between the substrate holder 44 and an outer ring shoulder 66. Preferably, the substrate holder 44 includes a beveled lower portion 70 that corresponds to a beveled upper edge 72 of the container body 42 which together form at least a partial circumferential outlet 74, from about 1 mm to about 30 mm, between the substrate holder 44 and the container body 42 for electrolyte flow therethrough. The outlet 74 preferably extends around the perimeter of the container body and cover, but it may alternatively be segmented as shown in FIG. 3 to provide electrolyte egress corresponding to the spaces adjacent the segmented auxiliary electrodes 84. The width of the outlet can be adjusted by raising or lowering the substrate holder 44 relative to the upper surface of the container body to accommodate different plating process requirements. Preferably, the width of the outlet is between about 2 mm and about 6 mm. The outlet 74 preferably has a narrow and sloped egress to enhance the outward flow of electrolyte and to minimize stagnant circulation *corners* where bubble entrapment can occur. As shown in FIG. 2, the outlet 74 provides electrolyte egress at about a 45° downward slope. The electrolyte egress outlet 74 continues through a space 76 between the inner surface of the outer ring shoulder 66 and the outer surface of the container body 42. Then the electrolyte flows through one or more outlets 78 connected to a pump (not shown) and recirculates through the electroplating cell 40 through inlet 50.

A ring or sleeve insert 80 disposed in the upper portion of the container body 42 can be used to precisely define the plating area of the substrate. The insert 80 is modularly changeable to adapt an electroplating cell for various substrate sizes, including 200 mm and 300 mm sizes, and shapes, including circular, rectangular, square, etc. The size and the shape of the container body 42 are preferably changed correspondingly for each size and shape of substrate to approximate the size and shape of the substrate. The insert 80 also insulates and protects the edge of the substrate 48 from non-uniform plating by limiting the current flow to the circumference of the plating surface, thereby reducing the fringing effects encountered when the cell size is larger than the plating surface.

As plating occurs on the substrate, ions in solution plate (deposit) from the solution onto the substrate. To provide additional plating material, ions must diffuse through a diffusion boundary layer adjacent the plating surface. Typically, in the prior art, replenishment is provided through hydrodynamic means by the flow of solution past the substrate and by substrate rotation. However, hydrodynamic replenishment schemes still provide inadequate replenishment because of the no slip condition at the boundary layer where the electrolyte immediately adjacent the plating surface has zero velocity and is stagnant. To address these limitation and increase replenishment, a vibrational agitation member 82 is provided to control the mass transport rates (boundary layer thickness) at the surface of the substrate. The vibrational agitation member 82 is preferably mounted to the substrate holder 44 to vibrate the substrate 48. The vibrational agitation member 82 usually comprises a motor or a vibrational transducer that moves the substrate holder 44 back and forth on one or more axes at a frequency from about 10 Hz to about 20,000 Hz. The amplitude of the vibration is preferably between about 0.5 micron and about 100,000 micron. The vibrational agitation member 82 may also provide additional vibration in a second direction that is parallel to the substrate plating surface 54, such as vibrating the substrate in the x-y directions, or in a direction orthogonal to the substrate plating surface 54, such as in the x-z directions. Alternatively, the vibrational agitation member 82 may vibrate the substrate in multiple directions, such as the x-y-z directions.

The frequency of the vibration can be synchronized to the plating cycles (discussed in detail below) to tailor-fit the mass transport rates to the deposition process needs. Conventional electroplating systems cannot incorporate this feature because high frequency interruptions or reversals cannot be made in pumped induced electrolyte flow due to the fluid's inertia in conventional electroplating systems. The vibration also enhances removal of residual plating and rinse solution from the substrate surface after completion of the plating cycle.

The substrate holder 44 can also be rotated, either fully or partially, in addition to the vibrational agitation to further enhance uniform plating thickness. A rotational actuator (not shown) can be attached to the substrate holder 44 and spin, or partially rotate in an oscillatory manner, the substrate holder about a central axis through the center of the substrate holder. The rotational movement of the plating surface against the electrolyte enhances the exposure of fresh electrolyte across the plating surface to improve deposition uniformity.

Another advantage of vibrating the substrate 48 is that the vibration exposes the vias and trenches to fresh electroplating solutions. As the solution adjacent to the substrate becomes depleted of the deposition metal, the reciprocation of the substrate replenishes the areas adjacent to the vias and trenches with fresh electroplating solution preferably having a high concentration of copper or other deposition metal. This is achieved by translating the mouth of the trench or the via on a substrate plating surface to a region of the solution that has not been facing the trench or via and is therefore less depleted of the reactant. An alternative to vibrating the substrate holder 44 and the substrate 48 is vibrating the electrolyte. A vibrational transducer (not shown) can be placed within the container body to directly agitate the electrolyte, or the vibrational transducer can be placed outside of the container body and indirectly agitate the electrolyte by vibrating the container body. The vibrational agitation member 82 also helps to eliminate bubble related defects by encouraging bubbles to move from the plating surface 54 and be evacuated from the cell 40.

Figure 5:
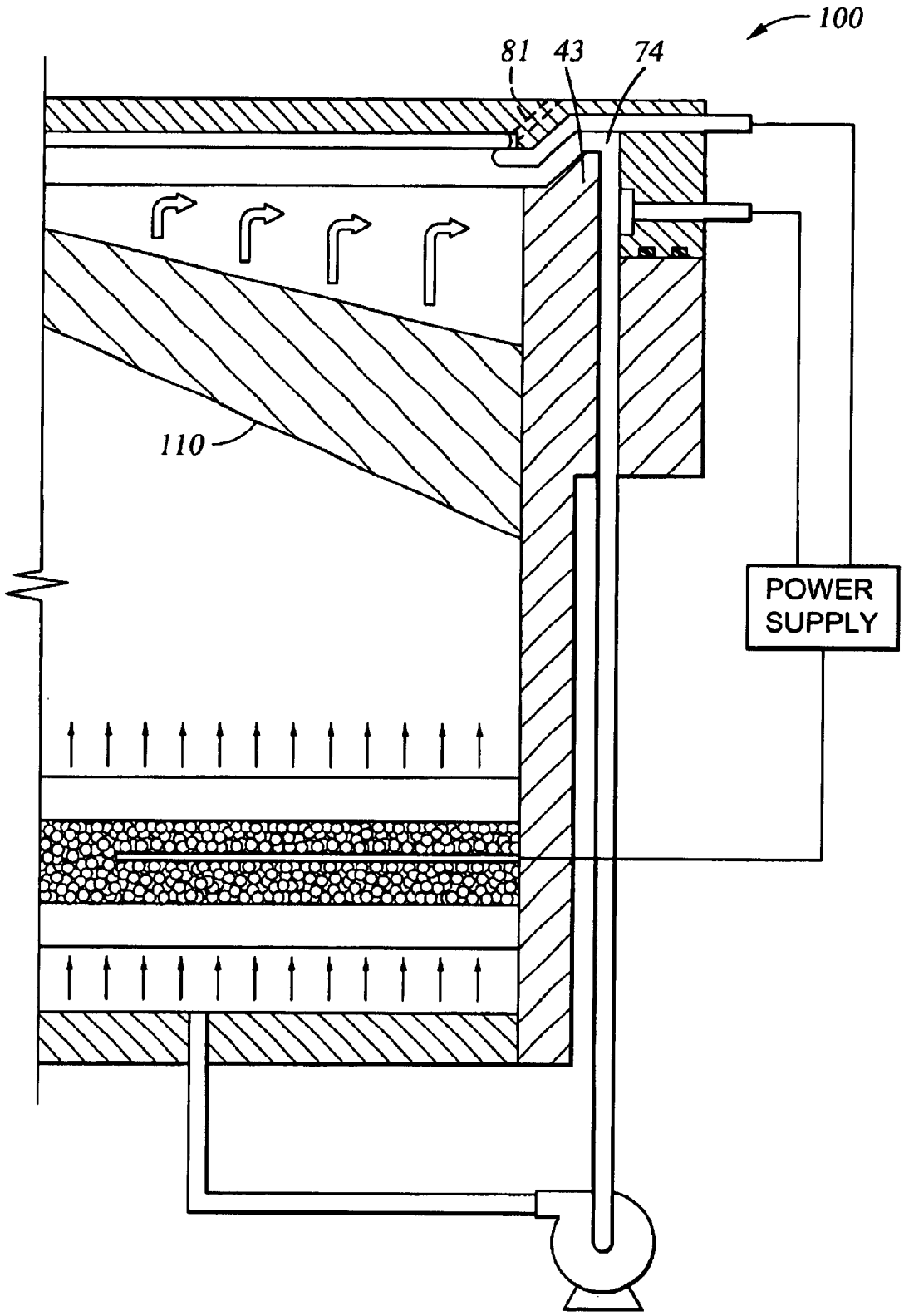
FIG. 5 is a partial vertical cross sectional schematic view of a weir plater containing soluble copper beads enclosed between porous diaphragms in the anode compartment.

Gas bubbles may be trapped with the substrate installation into the cell, carried by the electrolyte flow through the system, or generated by the electrochemical reaction at the anode or the cathode. The gas bubbles are preferably exhausted from the cell to prevent defects in the plating process. A plurality of gas diverting vanes may be disposed above the anode to divert evolved gases toward the sidewall of the electrolyte container. Generally, gas bubbles will move to a higher elevation because of their lower specific gravity, and the gas bubbles flows along with the electrolyte that flows generally upward and outward with respect to the substrate. The vibration is applied to the electrolyte or the substrate support member detaches the bubbles from the substrate surface and enhances the movement of the gas bubbles out of the cell. Preferably, a plurality of gas release ports 81 (as shown in FIG. 5) are disposed adjacent the periphery of the substrate support surface 46 through the substrate holder 44 to evacuate gas bubbles from the cell. The gas release ports 81 are positioned at an upward angle to allow gas bubble release from the cell 40 while preventing electrolyte egress through the gas release slots. A number of optional measures are available to prevent electrolyte squirting out of the gas release ports 81. First, the gas release ports can be positioned higher than the static head of the electrolyte. Second, the gas release ports can be treated to be hydrophobic, for example, by a Teflon® tube insert. Third, a counter gas pressure sufficient to prevent solution egress can be externally applied through the exit of the gas release ports. Lastly, the gas release ports can be capped with a small reservoir sufficient in volume to capture the gas bubbles.

In addition to the anode electrode and the cathode electrode, an auxiliary electrode can be disposed in contact with the electrolyte to change the shape of the electrical field over the substrate plating surface. An auxiliary electrode 84 is preferably disposed outside the container body to control the deposition thickness, current density and potential distribution in the electroplating cell to achieve the desired electroplating results on the substrate. As shown in FIG. 2, the auxiliary electrode 84 is disposed within the outer ring 66 adjacent the inner surface of the outer ring 66. Alternatively, the auxiliary electrode 84 can be disposed within the container body at the top portion of the container body as shown in FIG. 2a. The auxiliary electrode 84 is preferably mounted outside the container body because copper deposits may build up on the auxiliary electrode when it is cathodically polarized, or the deposited copper may dissolve, releasing particulates when the auxiliary electrode is anodically polarized. With the auxiliary electrode 84 placed within the container body 42, the non-adhering deposits may flake off or the dissolving particulate matter may get in solution and contact the substrate plating surface 54 and cause damage or defects on the substrate. By placing the auxiliary electrode 84 outside the container body 42, non-adhering deposition material flows with the outflowing electrolyte to the recirculating pump. The outflowing electrolyte is filtered, and the non-adhering deposits are removed from the system. Furthermore, because the flow rate of the electrolyte is relatively high outside of the container body 42 (as compared to the flow rate near the substrate plating surface 54), non-adhering deposits are less likely to occur on the auxiliary electrode 84. Another advantage of placing the auxiliary electrode outside of the container body is that periodic maintenance can be easily performed by replacing another modular auxiliary electrode unit onto the electroplating cell. Placement of the auxiliary electrodes inside the container body, however, may provide a higher degree of control and resulting higher uniformity of deposition.

The auxiliary electrode 84 may comprise a ring, a series of concentric rings, a series of segmented rings, or an array of spaced electrodes to match a corresponding array of cathode contact pins 56. The auxiliary electrode 84 may be positioned on the same plane as the substrate plating surface 54 or on varying planes to tailor fit the current and potential distribution on the substrate 48. Alternatively, a plurality of concentric ring auxiliary electrodes can be configured to activate at different potentials or to activate potentials in sequence according to the desired process. FIG. 3 shows a configuration of an auxiliary electrode 84 comprising an array of segmented electrodes matching an array of cathode contact pins 56 to overcome the effect of discrete contacts that tend to localize the deposition thickness near the region of the contact. The auxiliary electrode 84 shapes the electric field by equalizing the localization effects of the discrete contacts. The auxiliary electrode 84 also can be used to eliminates the adverse effects of the initially resistive substrate on the deposition thickness distribution by varying the current/potential according to the deposition time and thickness. The current/potential auxiliary electrode 84 may be dynamically adjusted from a high current level during an initial stage of electroplating to a gradually decreasing current/potential as the electroplating process continues. The auxiliary electrode may be turned off before the end of the electroplating process, and can be programmed to match various process requirements. The use of the auxiliary electrode eliminates the need for physical, non-adjustable cell hardware to abate the initial resistive substrate effect. Also, the auxiliary electrode can be synchronized with the reverse plating cycles to further tailor fit the desired deposition properties.

Alternatively, the auxiliary electrode comprises a segmented resistive material having multiple contact points such that the voltage of the auxiliary electrode varies at different distances from the contact points. This configuration provides corresponding variations of potential for a discrete cathode contacting member configuration. Another variation of the auxiliary electrode provides a variable width electrode that corresponds to a configuration of discrete cathode contacting pins so that an effective higher voltage (and current) is provided at the substrate contacting points of the cathode contact member while an effective lower voltage (and current) is provided in the region between the substrate/cathode contacting points. Because the effective voltage provided by the variable width auxiliary electrode decreases as the distance increases between the auxiliary electrode and the edge of the substrate, the variable width auxiliary electrode provides a closer distance between the auxiliary electrode and the edge of the substrate where the cathode contact member are located.

Preferably, a consumable anode 90 is disposed in the container body 42 to provide a metal source in the electrolyte. As shown in FIG. 2, a completely self-enclosed modular, soluble copper anode 90 is disposed about the middle portion of the container body 42. The modular anode comprises metal particles 92 or metal wires, or a perforated or a solid metal sheet, such as high purity copper, encased in a porous enclosure 94. In one embodiment, the enclosure 94 comprises a porous material such as a ceramic or a polymeric member within which the metal particles 92 are encased. An anode electrode contact 96 is inserted into the enclosure 94 in electrical contact with the metal particles 92. The anode electrode contact 96 can be made from an insoluble conducive material, such as titanium, platinum, platinum-coated stainless steel, and connected to a power supply 49 to provide electrical power to the anode. The porous sheet of the enclosure 94 acts as a filter that provides particle-free electrolyte to the substrate plating surface 54 because the filter keeps the particulates generated by the dissolving metal within the encased anode. The soluble copper anode 90 also provides gas generation-free electrolyte into the solution unlike the process using a gas-evolving insoluble anode and minimizes the need to constantly replenish the copper electrolyte. The metal particles 92 can be in the shape of pellets or wires or a perforated plate encased in or confined within electrode 96. These shapes offer high surface area as well as a passage for the electrolyte flow. The high surface area of the metal particles minimizes anode polarization and oxidative side reactions, including oxygen coevolution, and leads to a moderate current density for copper plating during the substrate anodic dissolution stage of the periodic reverse plating cycle (discussed in more detail below). If it is desirable to have a smaller surface area exposed to the electrolyte due to excess additive decomposition on the anode, it may be desirable to cover the downward facing side (facing towards the flow) of the perforated plate sheet or wires with an insulating material.

Preferably, the anode 90 is a modular unit that can be replaced easily to minimize interruptions and to allow easy maintenance. Preferably, the anode 90 is positioned a distance greater than one (1) inch, and more preferably, greater than 4 inches, away from the substrate plating surface 54 (for a 200 mm substrate) to assure that the effects of level variations in the anode copper caused by anode dissolution, particulate fluidization and assembly tolerances become negligible once the electrolyte flow reaches the substrate surface.

FIG. 5 is a partial vertical cross sectional schematic view of an alternative embodiment of an electro-chemical deposition cell of the invention. The embodiment as shown is a weir plater 100 comprising similar components as the electroplating cell 40 described above. However, the container body include an upper annular weir 43 that has an upper surface at substantially the same level as the plating surface such that the plating surface is completely in contact with the electrolyte even when the electrolyte is barely flowing out of the electrolyte egress gap 74 and over the weir 43. Alternatively, the upper surface of the weir 43 is positioned slightly lower than the plating surface such that the substrate plating surface is positioned just above the electrolyte when the electrolyte overflows the weir 43, and the electrolyte attaches to the substrate plating surface through meniscus properties (i.e., capillary force). Also, the auxiliary electrode may need to be repositioned closer to the electrolyte egress to ensure contact with the electrolyte to be effective.

A flow adjuster 110 comprising a variable thickness conical profile porous barrier can be disposed in the container body between the anode and the substrate to enhance flow uniformity across the substrate plating surface. Preferably, the flow adjuster 110 comprises a porous material such as a ceramic or a polymer which is used to provide a selected variation in electrolyte flow at discrete locations across the face of the substrate. FIG. 5 illustrates the electrolyte flow between the porous barrier and the substrate plating surface along arrows A. The flow adjuster 110 is increasingly thinner toward the center of the structure, and thus of the wafer, which results in a greater flow of electrolyte through this region and to the center of the substrate to equalize the electrolyte flow rate across the substrate plating surface. Without the flow adjuster, the electrolyte flow is increased from the central portion to the edge portion because the electrolyte egress is located near the edge portion. Also, the cone-shaped flow adjuster 110 tapers away from the substrate surface, extending furthest away from the substrate surface at the edge of the substrate. Preferably, the cone-shaped tapering and the increasing thickness of the flow adjuster are optimized according to the required electrolyte flow rate and the size of the substrate plating surface to provide a uniform electrolyte flow rate across the substrate plating surface. A similar effect can be achieved with a perforated plate. The size and spacings of the perforations may be adjusted to produce the desired flow distribution.

A broken substrate catcher (not shown) can be placed within the container body to catch broken substrate pieces. Preferably, the broken substrate catcher comprises a mesh, a porous plate or membrane. The porous wedge or the perforated plate described above may also serve for this purpose.

A refining electrode (not shown) can be placed in the sump (not shown) for pre-electrolysis of the electrolyte and for removal of metal and other chemical deposit buildup in the sump. The refining electrode can be continuously activated or periodically activated according to the needs of the system. The refining electrode when made of copper and polarized anodically can be used to replenish copper in the bath. This external electrode can thus be used to precisely adjust the copper concentration in the bath.

A reference electrode (not shown) can be employed to determine precisely the polarization of the anode, the cathode and the auxiliary electrode.

Once the electroplating process is completed, the electrolyte can be drained from the container body to an electrolyte reservoir or sump, and a gas knife can be incorporated to remove the film of electrolyte remaining on the substrate plating surface. The gas knife comprises a gas inlet, such as a retractable tube or an extension air tube connected to a hollow anode electrode, which supplies a gas stream or a gas/liquid dispersion that pushes the electrolyte off the substrate surface. The gas can also be supplied through the gap between the substrate holder 44 and the container body 42 to blow on the substrate surface.

A deionized water rinse system (not shown) can also be incorporated into the electroplating system to rinse the substrate free of electrolyte. A supply of deionized water or other rinsing solutions can be connected to the inlet 50 and selectively accessed through a inlet valve. After the electrolyte has been drained from the container body, the deionized water or other rinsing solution can be pumped into the system through inlet 50 and circulated through the container body to rinse the substrate surface. While the processed substrate is being rinsed, the cathode and anode power supply is preferably inactivated in the cell. The deionized water fills the cell and flows across the surface of the substrate to rinse the remaining electrolyte off the surface. The vibrational member may be activated to enhance rinsing of the plated surface. A number of separate deionized water tanks can be utilized sequentially to increase the degree of purity of the rinse water. To utilize more than one rinsing solution supply, a rinsing cycle is preferably completed and the rinsing solution completely drained from the cell before the next rinsing solution is introduced into the cell for the next rinsing cycle. The used deionized water rinse can also be purified by plating out the metal traces acquired during the rinse cycle by the rinsing solution or by circulating the used deionized water through an ion exchange system.

Figure 6A:
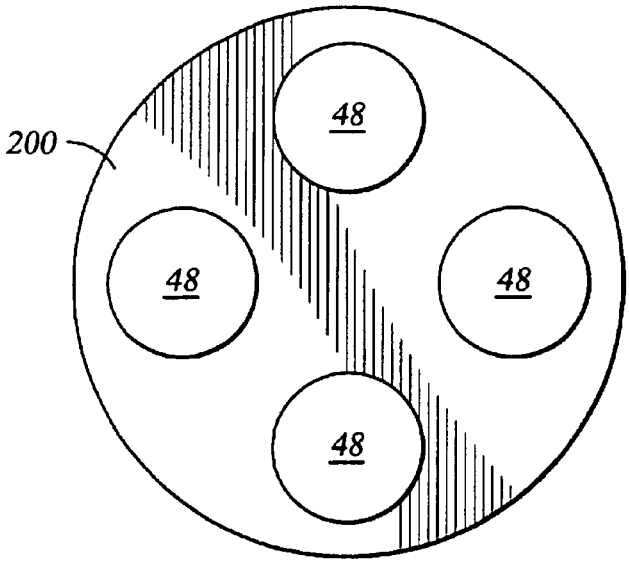
FIGS. 6a and 6b are schematic illustrations of an embodiment of a multi-substrate processing unit.
Figure 6B:
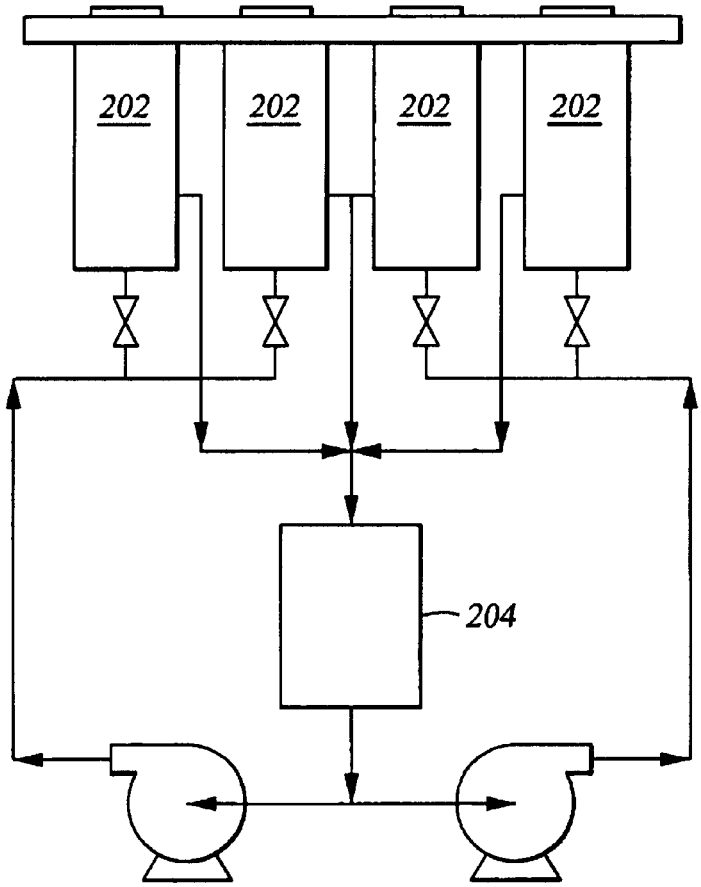

FIG. 6a and 6b are schematic illustrations of an embodiment of a multi-substrate processing unit. A plurality of substrates 48 are mounted on a substrate holder 200, and a matching plurality of container bodies 202 are positioned to receive the substrate plating surfaces. The container bodies preferably share a common electrolyte reservoir 204. However, each individual electroplating cell 202 preferably comprises individual electroplating system controls to ensure proper processing of individual substrates.

Figure 7:
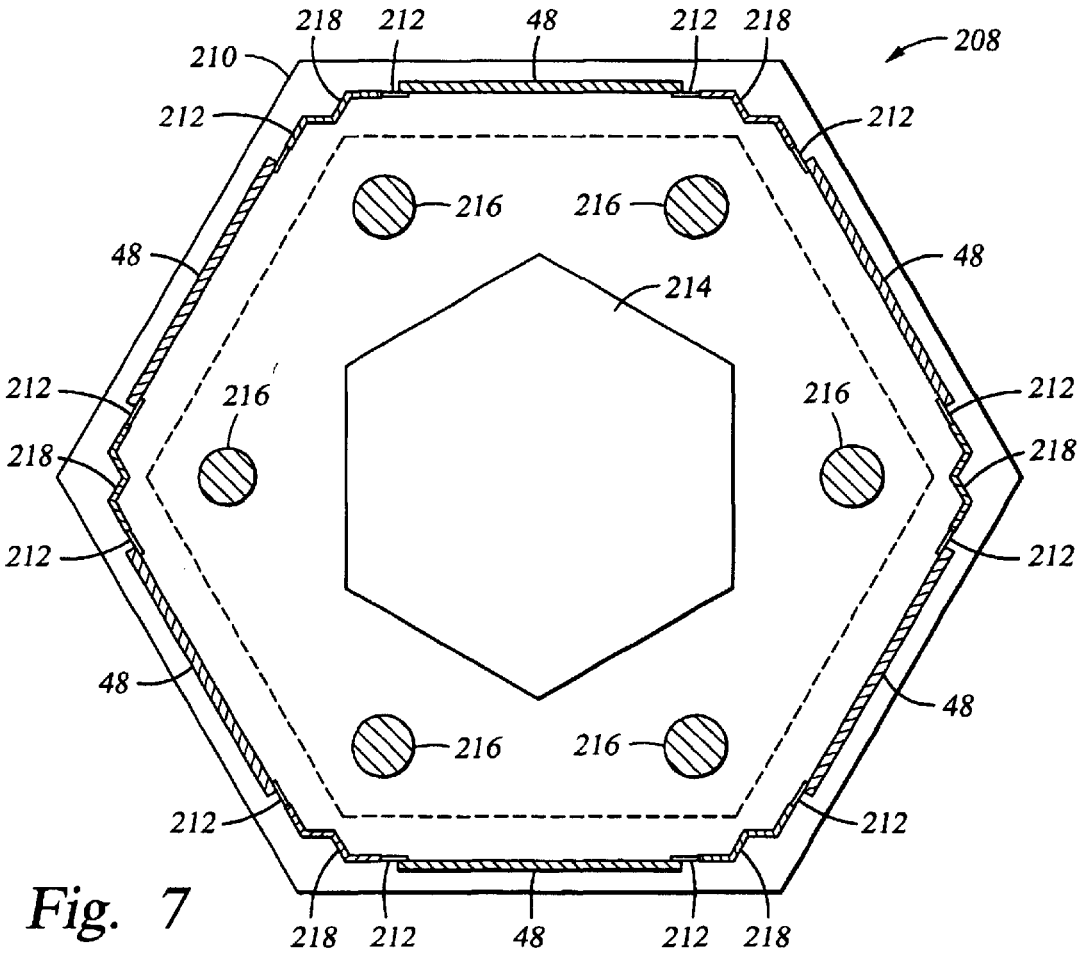
FIG. 7 is a horizontal cross sectional schematic view of another embodiment of a multi-substrate batch processing unit.

FIG. 7 is a horizontal cross sectional schematic view of another embodiment of a multi-substrate batch processing unit 208. The electrolyte container body 210 as shown in FIG. 7 is a hexagonal drum, but any polygonal drum can be utilized as long as each face of the polygon is large enough to mount a substrate 48 thereon. A cathode contact member 212 is also mounted on each face of the polygon to provide electrical current to the substrate plating surface 54. An anode 214 preferably comprises a concentric polygonal drum rotatably mounted within the container body 210. Alternatively, the anode 214 may comprises a cylindrical body mounted concentrically within the container body 210. The container body 210 can also be a cylindrical body having multiple substrate cavities to receive substrates. Also, a number of substrates can be mounted on each face of the polygon.

A plurality of auxiliary electrodes 216 can be placed in the cell at the corners of the polygon. Alternatively, ring shaped or segmented ring auxiliary electrodes 218 can be placed around each substrate 48 to match the cathode contact members 212 similarly to the arrangement of the auxiliary electrodes shown in FIG. 3. Preferably, the auxiliary electrodes dynamically adjust to compensate current distribution over the substrate by gradually decreasing the current of the auxiliary electrodes as the resistive substrate effect tapers off after the initial deposition period. A porous separator/filter (not shown) can be placed between the anode and the cathode to trap particulates.

A vibrational agitation member (not shown) can be connected to the container body to vibrate the substrates. However, substrate vibration may be unnecessary when the polygonal anode drum is rotated sufficient fast, preferably between about 5 revolutions per minute (RPM) and about 100 RPM, to provide a high degree of agitation to the electrolyte. The rotating polygonal anode also provides a pulsed or transient electrical power (voltage/current combination) due to the varying distance between the active anode surfaces and the substrate because of the rotation. Because the anode is polygonal in shape, as the anode rotates, the distance between cathode and the anode varies from a maximum when the anode polygon faces are aligned with the cathode polygon faces in parallel planes and a minimum when the anode polygon corners are aligned with the centers of the cathode polygon faces. As the distance between the anode and the cathode varies, the electrical current between the anode and the cathode varies correspondingly.

Another variation provides a horizontally positioned polygonal drum. The container body is rotated around the horizontal axis to position one polygon face on top to allow loading and unloading of a substrate while the other substrates are still being processed.

Yet another variation provides the substrates to be mounted on the outer surfaces of the inner polygon drum which now is the cathode, and the container body becomes the anode. This configuration allows the cathode drum to be lifted from the electrolyte for easy loading and unloading of the substrates.

Operating Conditions

In one embodiment of the invention, a periodic reverse potential and/or current pulse or an intermittent pulse current is delivered to the substrate to control the mass transfer boundary layer thickness and the grain size of the deposited material. The periodic reverse and pulse current/potential also enhances deposit thickness uniformity. The process conditions for both the deposition stage and the dissolution stage can be adjusted to provide the desired deposit profile, usually a uniform, flat surface. In general, plating/deposition is accomplished with a relatively low current density for a relatively long interval because low current density promotes deposition uniformity, and dissolution is accomplished with a relatively high current density for a relatively short interval because high current density leads to highly non-uniform distribution that preferentially shaves or dissolves deposited peaks.

For a *pre-determined* grain size, a current pulse comprising a higher negative current density for a short time (between about 50 mA/cm$^2$ and about 180 mA/cm$^2$ for about 0.1 to 100 ms) is applied to nucleate an initial layer of copper deposits followed by a constant current density applied for a long interval (between about 5 mA/cm$^2$ and about 80 mA/cm$^2$ for up to a few minutes) to continue deposition. The length of the deposition interval can be adjusted according to the deposition rate to achieve the desired deposition thickness over the substrate surface.

To completely fill high aspect ratio trenches, vias or other interconnect features, a current reversal or dissolution interval may be applied to achieve some dissolution of the deposited metal. The dissolution interval is preferably applied at a current density much higher than the current density of the deposition current but for a short time interval to ensure a net deposit. The dissolution interval can be applied once or periodically during a deposition process to achieve the desired results. The deposition interval can be divided into a number of short intervals followed by a corresponding number of even shorter dissolution intervals to completely fill high aspect ratio interconnect features. Then, a constant deposition current density is applied to achieve a uniform deposition thickness across the field. Typically, a deposition cycle comprises a deposition current density of between about 5 mA/cm$^2$ and about 40 mA/cm$^2$ followed by a dissolution current density between about 5 mA/cm$^2$ and about 80 mA/cm$^2$. The deposition cycle is repeated to achieve complete, void-free filling of high aspect ratio features, and optionally, a final application of the deposition current density is applied to form a uniform field deposition thickness across the substrate plating surface. Alternatively, the current reversal/dissolution cycle can be achieved by providing a constant reverse voltage instead of a constant reverse current density.

Because the resistive substrate effect is dominant during the beginning of the plating cycle, a relatively low current density, preferably about 5 mA/cm$^2$, is applied during the initial plating. The low current density provides very conformal plating substantially uniformly over the plating surface, and the current density is gradually increased as the deposition thickness increases. Also, no current reversal for dissolution is applied during the initial stage of the plating process so that the metal seed layer is not at risk of being dissolved. However, if a current reversal is introduced for striking or nucleation purposes, the reverse current density is applied at a low magnitude to ensure that no appreciable metal seed layer is dissolved.

Optionally, a relaxation interval between the deposition interval and the dissolution interval allows recovery of depleted concentration profiles and also provides improved deposition properties. For example, a relaxation interval where no current/voltage is applied between the deposition interval and the dissolution interval, allows the electrolyte to return to optimal conditions for the processes.

Preferably, the vibration frequency, the pulse and/or periodic reverse plating, the auxiliary electrode current/voltage and the electrolyte flow are all synchronized for optimal deposition properties. One example of synchronization is to provide vibration only during the deposition interval so that the boundary diffusion layer is minimized during deposition and to eliminate vibration during the dissolution interval so that the dissolution proceeds under mass transport control.

To improve adhesion of the metal to the seed layer during plating, a very short, high current density strike is applied at the beginning of the plating cycle. To minimize bubble related defects, the strike must be short, and the current density must not exceed values at which hydrogen evolves. This current density, preferably between about 100 mA/cm$^2$ to about 1000 mA/cm$^2$, corresponds to an overpotential not exceeding −0.34 V (cathodic) versus for the reference electrode. A separate striking process using a different electrolyte may be required for adhesion of the metal plating material. Separate striking can be accomplished in a separate cell with different electrolytes or in the same cell by introducing and evacuating different electrolytes. The electrolytes used for separate striking is typically more dilute in metal concentration and may even be a cyanide based formulation.

The metal seed layer is susceptible to dissolution in the electrolyte by the exchange current density of the electrolyte (about 1 mA/cm$^2$ for copper). For example, 1500 Å of copper can be dissolved in about 6 minutes in an electrolyte with no current applied. To minimize the risk of the seed layer being dissolved in the electrolyte, a voltage is applied to the substrate before the substrate is introduced to the electrolyte. Alternatively, the current is applied instantaneously as the substrate comes in contact with the electrolyte. When a deposition current is applied to the substrate plating surface, the metal seed layer is protected from dissolution in the electrolyte because the deposition current dominates over the equilibrium exchange current density of the electrolyte.

The invention also provides for in situ electroplanarization during periodic reverse plating. Preferably, both deposition and dissolution steps are incorporated during a single pulse or a sequence of rapid pulses such that at the end of the process the trenches, vias and other interconnect features are completely filled and planarized. The electrochemical planarization step comprises applying a high current density during dissolution. For example, a dissolution reverse current density of about 300 mA/cm$^2$ is applied for about 45 seconds as an electrochemical planarization step that leads to a substantially flat surface with just a residual dimple of about 0.03 μm. This electrochemical planarization substantially reduces the need for chemical mechanical polishing (CMP) and may even eliminate the need for CMP in some applications.

Chemistry

An electrolyte having a high copper concentration (*e.g.*, >0.5M and preferably between 0.8M to 1.2M) is beneficial to overcome mass transport limitations that are encountered with plating of sub-micron features. In particular, because sub-micron features with high aspect ratios typical allow only minimal or no electrolyte flow therein, the ionic transport relies solely on diffusion to deposit metal into these small features. A high copper concentration preferably about 0.8M or greater, in the electrolyte enhances the diffusion process and eliminates the mass transport limitations because the diffusion flux is proportional in magnitude to the bulk electrolyte concentration. A preferred metal concentration is between about 0.8 and about 1.2 M. Generally, the higher the metal concentration the better; however, one must be careful not to approach the solubility limit where the metal salt will precipitate.

The conventional copper plating electrolyte includes a high sulfuric acid concentration (about 1 M) to provide high conductivity to the electrolyte. The high conductivity is necessary to reduce the non-uniformity in the deposit thickness caused by the cell configuration of conventional copper electroplating cells. However, the present invention (including the cell configuration) provides a more uniform current distribution. In this situation a high acid concentration is detrimental to deposition uniformity because the resistive substrate effects are amplified by a highly conductive electrolyte. Furthermore, the dissolution step during periodic reverse cycle requires a relatively low electrolyte conductivity because a highly conductive electrolyte may promote non-uniformity as a result of the high reverse current density. Also, the presence of a supporting electrolyte, e.g. acid or base, will lower the ionic mass transport rates, which, as explained above, are essential for good quality plating. Also, a lower sulfuric acid concentration provides a higher copper sulfate concentration due to elimination of the common ion effect. Furthermore, particularly for the soluble copper anode, a lower acidic concentration minimizes harmful corrosion and material stability problems. Thus, the invention contemplates an electroplating solution having no acid or very low acid concentrations. Preferably, the sulfuric acid concentration is in the range of 0 (absence) to about 0.2M. Additionally, a pure or relatively pure copper anode can be used in this arrangement.

In addition to copper sulfate, the invention contemplates copper salts other than copper sulfate such as copper gluconate and copper sulfamate that offer high solubility and other benefits, as well as salts such as copper nitrate, copper phosphate, copper chloride and the like.

The invention also contemplates the addition of acids other than sulfuric acid into the electrolyte to provide for better complexation and/or solubility for the copper ions and the copper metal which results in improved deposition properties. These compounds include anthranilic acid, acetic acid, citric acid, lactic acid, sulfamic acid, ascorbic acid, glycolic acid, oxalic acid, benzenedisulfonic acid, tartaric acid and/or malic acid.

The invention also contemplates additives to produce asymmetrical anodic transfer coefficient ($\alpha$) and cathodic transfer coefficient ($\beta$) to enhance filling of the high aspect ratio features during reverse plating cycle.

Ultra pure water can be introduced to the substrate plating surface to ensure complete wetting of the substrate plating surface which enhances the electroplating process into the small features. Steam can also be used to pre-wet the substrate plating surface.

Surfactants improve wetting by reducing surface tension of the solution. Surfactants contemplated by the present invention include: sodium xylene sulfonate, polyethers (polyethylene oxide), carbowax, sodium benzoate, ADMA8 amine, Adogen, Alamine, Amaizo, Brij, Crodesta, Dapral, Darnyl, didodecylmethyl propane sultaine, Dowex, Empol, Ethomeen, Ethomid, Enordet, Generol, Grilloten, Heloxy, hexadecyltrimethylammonium bromide, Hyamine, Hysoft, Igepal, Neodol, Octadecylbenzyl propane sultaine, Olcyl betaine, Peganate, Pluronic, Polystep, Span Surfynol, Tamol, Tergitol, Triton, Trilon, Trylox, Unithox, Varonic, Varamide, Zonyl, Benzylmethyl propane sultaine, alkyl or aryl betaine, alkyl or aryl sultaine.

Levellers improve deposition thickness uniformity. Brighteners improves the the reflectivity of the deposition surface by enhancing uniformity of the crystalline structure. Grain refiners produce smaller grains to be deposited. Levellers, brighteners and grain refiners can be specially formulated and optimized for the low acid, high copper electrolyte provided by the invention. In optimizing these compounds for use with the invention, the effects of the periodic reverse current need to also be considered. Levellers, brighteners and grain refiners contemplated by the present invention include:

inorganic minor components from: Salts of Se, As, In, Ga, Bi, Sb, TI, or Te; and/or organic minor components selected from (singly or in combination): acetyl-coenzyme, aminothiols; acrylamine;

azo dyes; alkane thiols, Alloxazine; 2-Aminopyrimidine; 2-Amino-1,3,4, thiadiazole; Amino methyl thiadiazole; 2-Aminothiadiazole; 3-amino 1,2,4, triazole; benzal acetone, Benzopurpurin; benzophnon, Behzotriazole, hydroxylbenzotriazole, Betizyldene acetone, Benzoic acid, Benzoil acetic acid ethyl ester, Boric acid, cacodylic acid, Corcumin Pyonin Y; Carminic Acid; Cinamic aldehyde, cocobetaine or decyl betaine, cetyl betaine, cysteine; DETA-PAC; 2',7'-dichlorofluorescein; dextrose, dicarboxilic amino acids; dipeptide diaminoacid (camsine=beta alanyl hystadine), 5-p-dimethylamine benzyldene Rhodamine, 5(p-Dimethylamino-benzylidene)-2-thio barbituric, dithizone, 4-(p-Ethoxyphnylazo)-m-phenylendi-amine, ethoxilated tetramethyl decynediol, ethoxilated quarternary amonium salts, ethyl benzoil acetate, ethoxylated beta-naphtol, EDTA, Evan Blue; di ethylene triamine penta acetic acid or salts, diethylenetriamine pentacetate, penta sodium salt, glucamine, glycerol compounds, di-glycine, d-glucamine, triglycine, glycogen, gluter aldehyde, glutamic acid, its salts and esters (MSG), sodium glucoheptonate, hydroxylbenzotriazole, hydroxysuccinimide, hydantoin, 4-(8-Hydroxy-5-quinolylazo)-1-naphtalenesulfonic acid, p-(p-hydroxyphenylazo) benzene sulfonic, insulin, hydroxybenzaldehyde, imidazoline; lignosulfonates; methionine; mercaptobenzi-imidazoles; Martius Yellow; 2-methyl-1-p-tolyltriazene, 3-(p-Nitrophenyl)-1-(p-phenylazophnyl)triazene; 4-(p-Nitrophenylazo) resorcinol, 4-(p-Nitrophenylazo)-1-naphthol, OCBA-orthochloro benzaldehyde, Phenyl propiolic acid, polyoxyethylene alcohols, quarternary amonium ethoxilated alcohols, and their fullyacid esters, polyethyleneimine, phosphalipides, sulfasalicilic acid, linear alkyl sulfonate, sulfacetamide, Solochrome cyanin; sugars; sorbitol, sodium glucoheptonate, sodium glycerophosphate, sodium mercaptobenzotriazole, tetrahydropyranyl amides, thiocarboxylic amides, thiocarbonyl-di-imidazole; thiocarbamid, thiohydantoin; thionine acetate, thiosalicilic acid, 2-thiolhistadine, thionine, thiodicarb, thioglycolic acid, thiodiglycols, thiodiglycolic acid, thiodipropionic acid, thioglycerol, dithiobenzoic acid, tetrabutylamonium, thiosulfone, thiosulfonic acid, thionicotineamide, thionyl chloride or bromide; thiourea; TIPA; tolyltriazole, triethanolamine; tri-benzylamine; 4,5,6, triaminopyrimidine; xylene cyanole.

While the foregoing is directed to the preferred embodiment of the present invention, other and further embodiments of the invention may be devised without departing from the basic scope thereof. The scope of the invention is determined by the claims which follow.

What is claimed is:

1. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container; wherein the substrate holder comprises:

i) a vacuum chuck having a substrate support surface; and ii) an elastomer ring disposed around the substrate support surface, the elastomer ring contacting a peripheral portion of the substrate;

b) a cathode electrically contacting the substrate plating surface;

c) an electrolyte container having an electrolyte inlet, an electrolyte outlet and an opening adapted to receive the substrate plating surface; and d) an anode electrically connected to the electrolyte.

2. The apparatus of claim 1 wherein the substrate holder further comprises:

iii) one or more bubble release ports having one or more openings adjacent an edge of the substrate supporting surface.

3. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container; wherein the substrate holder comprises:

i) a vacuum chuck having a substrate support surface; and ii) a gas bladder disposed around the substrate support surface, the gas bladder adapted to contact a peripheral portion of the substrate;

b) a cathode electrically contacting the substrate plating surface;

c) an electrolyte container having an electrolyte inlet, an electrolyte outlet and an opening adapted to receive the substrate plating surface; and d) an anode electrically connected to the electrolyte.

4. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface, wherein the cathode comprises a cathode contact member disposed at a peripheral portion of the substrate plating surface, the cathode contact member having a contact surface adapted to electrically contact the substrate surface, wherein the cathode contact member comprises a radial array of contact pins and a resistor connected in series with each contact pin;

c) an electrolyte container having an electrolyte inlet, an electrolyte outlet and an opening adapted to receive the substrate plating surface; and d) an anode electrically connected to the electrolyte.

5. The apparatus of claim 4 wherein the cathode further comprises a sensor connected across each resistor to monitor the current flowing through the resistor.

6. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface, wherein the electrolyte outlet is defined by a gap between a first surface on the substrate holder extending radially outward from the substrate plating surface and a surface of the electrolyte container; and d) an anode electrically connected to the electrolyte.

7. The apparatus of claim 6 wherein the gap has a gap width between about 1 mm and about 30 mm.

8. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a control electrode disposed in electrical contact with the electrolyte, the control electrode adapted to provide an adjustable electrical power.

9. The apparatus of claim 8 wherein the control electrode is disposed outside of the electrolyte container and in electrical contact with an outflowing electrolyte in the electrolyte outlet.

10. The apparatus of claim 8 wherein the control electrode comprises an array of electrode segments.

11. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a vibrator attached to the substrate holder, the vibrator transferring a vibration to the substrate holder.

12. The apparatus of claim 11 wherein the vibrator is adapted to vibrate the substrate holder in one or more direction.

13. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a sleeve insert disposed at a top portion of the electrolyte container, the sleeve insert defining the opening of the electrolyte container.

14. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a flow adjuster wedge disposed at a top portion within the electrolyte container.

15. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a gas knife to supply a gas flow across the wafer plating surface to remove residual electrolyte.

16. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a wafer catcher disposed at a top portion within the electrolyte container.

17. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a reference electrode adapted to monitor the cathode and the anode.

18. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) a rinsing solution supply selectively connected to the electrolyte inlet.

19. An apparatus for electrochemical deposition of a metal onto a substrate having a substrate plating surface, comprising:

a) a substrate holder adapted to hold the substrate in a position wherein the substrate plating surface is exposed to an electrolyte in an electrolyte container;

b) a cathode electrically contacting the substrate plating surface;

c) an electrolyte container having an electrolyte inlet, an electrolyte outlet and an opening adapted to receive the substrate plating surface;

d) an anode electrically connected to the electrolyte; and e) gas bubble diverting vanes disposed within the electrolyte container to divert gas bubbles toward an electrolyte container sidewall.

20. A method for electrochemical deposition of a metal onto a substrate, comprising:

a) providing an electrochemical deposition cell comprising:

1) a substrate holder;

2) a cathode electrically contacting a substrate plating surface;

3) an electrolyte container having an electrolyte inlet, an electrolyte outlet and an opening adapted to receive a substrate plating surface; and 4) an anode electrically connected to an electrolyte;

b) applying electrical power to the cathode and the anode; and c) flowing an electrolyte to contact the substrate plating surface, wherein the electrolyte flows between about 0.25 gallons per minute (gpm) to about 15 gpm.

21. A method for electrochemical deposition of a metal onto a substrate, comprising:

a) providing an electrochemical deposition cell comprising:

1) a substrate holder;

2) a cathode electrically contacting a substrate plating surface;

3) an electrolyte container having an electrolyte inlet, an electrolyte outlet and an opening adapted to receive a substrate plating surface; and 4) an anode electrically connected to an electrolyte;

b) applying electrical power to the cathode and the anode; and c) flowing an electrolyte to contact the substrate plating surface;

wherein the step of applying an electrical power to the cathode and the anode comprises:

1) applying a cathodic current density between about 5 $mA/cm^2$ and about 40 $mA/cm^2$ for about 1 second to about 240 seconds.

22. The method of claim 21 wherein the step of applying an electrical power to the cathode and the anode further comprises:

2) applying a dissolution reverse current between about 5 $mA/cm^2$ and about 80 $mA/cm^2$ for about 0.1 seconds to about 100 seconds.

23. A method for electrochemical deposition of a metal onto a substrate, comprising:

a) providing an electrochemical deposition cell comprising:

1) a substrate holder;

2) a cathode electrically contacting a substrate plating surface;

3) an electrolyte container having an electrolyte inlet, an electrolyte outlet and an opening adapted to receive a substrate plating surface; and 4) an anode electrically connected to an electrolyte;

b) applying electrical power to the cathode and the anode; and c) flowing an electrolyte to contact the substrate plating surface;

wherein the step of applying an electrical power to the cathode and the anode comprises:

1) applying a cathode current density between about 5 $mA/cm^2$ and about 40 $mA/cm^2$ for about 1 second to about 240 seconds;

2) applying a dissolution reverse current between about 5 $mA/cm^2$ and about 80 $mA/cm^2$ for about 0.1 seconds to about 100 seconds;

3) applying a cathodic current density between about 5 $mA/cm^2$ and about 40 $mA/cm^2$ for about 1 seconds to about 240 seconds; and 4) repeating step 2 and step 3.

24. A method for electrochemical deposition of a metal onto a substrate, comprising:

a) providing an electrochemical deposition cell comprising:

1) a substrate holder;

2) a cathode electrically contacting a substrate plating surface;

3) an electrolyte container having an electrolyte inlet an electrolyte outlet and an opening adapted to receive a substrate plating surface; and 4) an anode electrically connected to an electrolyte;

b) applying electrical power to the cathode and the anode;

c) flowing an electrolyte to contact the substrate plating surface;

d) providing a control electrode in electrical contact with an electrolyte of an electrochemical deposition cell; and e) adjusting the electrical power provided by the control electrode during deposition.

25. The method of claim 24 wherein the electrical power provided by the control electrode is adjusted synchronously with a deposition/dissolution cycle of an electrochemical deposition process.

26. A method for electrochemical deposition of a metal onto a substrate, comprising:

a) providing an electrochemical deposition cell comprising:

1) a substrate holder;

2) a cathode electrically contacting a substrate plating surface;

3) an electrolyte container having an electrolyte inlet, an electrolyte outlet and an opening adapted to receive a substrate plating surface; and 4) an anode electrically connected to an electrolyte;

b) applying electrical power to the cathode and the anode;

c) flowing an electrolyte to contact the substrate plating surface; and d) vibrating a component of the electrochemical deposition cell in one or more directions.

27. A method for electrochemical deposition of a metal onto a substrate, comprising:

a) providing an electrochemical deposition cell comprising:

1) a substrate holder;

2) a cathode electrically contacting a substrate plating surface;

3) an electrolyte container having an electrolyte inlet, an electrolyte outlet and an opening adapted to receive a substrate plating surface; and 4) an anode electrically connected to an electrolyte;

b) applying electrical power to the cathode and the anode;

c) flowing an electrolyte to contact the substrate plating surface; and d) vibrating a component of the electrochemical deposition cell at a vibrational frequency between about 10 Hz and about 20,000 Hz and a vibrational amplitude between about 0.5 micron and about 100,000 micron.

28. A method for electrochemical deposition of a metal onto a substrate, comprising:

a) providing an electrochemical deposition cell comprising:
   1) a substrate holder;
   2) a cathode electrically contacting a substrate plating surface;
   3) an electrolyte container having an electrolyte inlet, an electrolyte outlet and an opening adapted to receive a substrate plating surface; and
   4) an anode electrically connected to an electrolyte;

b) applying electrical power to the cathode and the anode;

c) flowing an electrolyte to contact the substrate plating surface;

d) rotating the substrate holder about a central axis through the substrate.

29. An apparatus for electrochemical deposition of a metal onto a substrate, comprising:

a) a substrate holder comprising:
   i) a vacuum chuck having a substrate support surface; and
   ii) an elastomer ring disposed around the substrate support surface, the elastomer ring contacting a peripheral portion of the substrate;

b) a cathode electrically contacting a substrate plating surface;

c) an electrolyte container having an electrolyte inlet, an electrolyte outlet and an opening adapted to receive a substrate plating surface, wherein the electrolyte outlet is defined by a gap between a first surface extending radially outward from the substrate plating surface and a surface of the electrolyte container;

d) an anode electrically connected to the electrolyte, the anode comprising:
   i) a porous enclosure for flow of an electrolyte therethrough;
   ii) a metal disposed within the enclosure; and
   iii) an electrode disposed within the enclosure;

e) a control electrode in electrical contact with an electrolyte, the control electrode adapted to provide an adjustable electrical power; and f) a vibrator attached to the substrate holder, the vibrator adapted to transfer a vibration in one or more directions in the substrate holder.

*30. An apparatus for electrochemically depositing a metal onto a semiconductor substrate, comprising:*

*a container having a fluid inlet, a fluid outlet, and an open portion, the container being configured to contain an electrochemical plating solution therein;*

*a substrate holder assembly configured to electrically contact a substrate plating surface and support the plating surface in fluid communication with the electrochemical plating solution via the open portion;*

*an anode in fluid communication with the electrochemical plating solution; and*

*a porous fluid flow adjustment member positioned across the container between the anode and the open portion, wherein the porous fluid flow adjustment member comprises a ceramic member.*

*31. An apparatus for electrochemically depositing a metal onto a semiconductor substrate, comprising:*

*a container having a fluid inlet, a fluid outlet, and an open portion, the container being configured to contain an electrochemical plating solution therein;*

*a substrate holder assembly configured to electrically contact a substrate plating surface and support the plating surface in fluid communication with the electrochemical plating solution via the open portion, wherein the substrate holder assembly comprises a cathode contact member and a backside substrate engaging member configured to urge the substrate plating surface against the cathode contact member;*

*an anode in fluid communication with the electrochemical plating solution; and*

*a porous fluid flow adjustment member positioned across the container between the anode and the open portion.*

*32. The apparatus of claim 31, wherein the cathode contact member comprises:*

*an annular member; and*

*at least one substrate contact element positioned on the annular member.*

*33. The apparatus of claim 32, comprising an insulative coating positioned on an outer surface of the annular member.*

*34. The apparatus of claim 32, wherein the at least one substrate contact element comprises a continuous ring configured to electrically contact a perimeter of the plating surface.*

*35. The apparatus of claim 34, comprising an O-ring seal member positioned radially inward of the continuous ring.*

*36. The apparatus of claim 32, wherein the at least one substrate contact element comprises a plurality of substrate contact pins radially positioned on the annular member to electrically contact a perimeter of the plating surface.*

*37. The apparatus of claim 36, comprising an annular seal member positioned on the annular member radially inward of the plurality of substrate contact pins, the annular seal member being configured to sealable engage the plating surface to prevent the electrochemical plating solution from passing therebetween.*

*38. The apparatus of claim 32, comprising at least one bubble release port positioned adjacent an edge of the annular member.*

*39. The apparatus of claim 31, wherein the backside substrate engaging member comprises an elastomer seal positioned to sealably engage a backside perimeter of the substrate.*

*40. The apparatus of claim 31, wherein the backside substrate engaging member comprises an inflatable bladder assembly positioned to engage a backside perimeter of the substrate.*

*41. An apparatus for electrochemically depositing a metal onto a semiconductor substrate, comprising:*

*a container having a fluid inlet, a fluid outlet, and an open portion, the container being configured to contain an electrochemical plating solution therein;*

*a substrate holder assembly configured to electrically contact a substrate plating surface and support the plating surface in fluid communication with the electrochemical plating solution via the open portion;*

*an anode in fluid communication with the electrochemical plating solution;*

*a porous fluid flow adjustment member positioned across the container between the anode and the open portion; and*

*an egress gap of between about 1 mm and about 30 mm between an outer surface of the substrate holder assembly and an inner surface of the container, wherein the egress gap is between about 2 mm and about 6 mm.*

*42. An apparatus for electrochemically depositing a metal onto a semiconductor substrate, comprising:*

*a container having a fluid inlet, a fluid outlet, and an open portion, the container being configured to contain an electrochemical plating solution therein;*

*a substrate holder assembly configured to electrically contact a substrate plating surface and support the plating surface in fluid communication with the electrochemical plating solution via the open portion;*

*an anode in fluid communication with the electrochemical plating solution;*

*a porous fluid flow adjustment member positioned across the container between the anode and the open portion; and*

*at least one auxiliary electrode positioned in fluid communication with the electrochemical plating solution.*

*43. The apparatus of claim 42, wherein the at least one auxiliary electrode comprises at least one electrode member positioned below the substrate plating surface, the at least one auxiliary electrode being in electrical communication with a source of electrical power.*

* * * * *

UNITED STATES PATENT AND TRADEMARK OFFICE

CERTIFICATE OF CORRECTION

PATENT NO. : RE 40,218 E
APPLICATION NO. : 10/622001
DATED : April 8, 2008
INVENTOR(S) : Landau It is certified that error appears in the above-identified patent and that said Letters Patent is hereby corrected as shown below:

Column 1, Line 34, please delete “increases” and insert --increase--;

Column 2, Line 26, please delete “definition” and insert --definitions--;

Column 2, Line 41, please delete “conductive” and insert --conducting--;

Column 3, Line 62, please delete “contract” and insert --contact--;

Column 5, Line 14, please delete “particular-free” and insert --particulate-free--;

Column 6, Line 16, please delete “a” and insert --as--;

Column 10, Line 17, please delete “solution” and insert --solutions--;

Column 12, Line 43, please delete “member” and insert --membrane--;

Column 12, Line 47, please delete “conducive” and insert --conductive--;

Column 14, Line 65, please delete “comprises” and insert --comprise--;

Column 15, Line 19, please delete “sufficient” and insert --sufficiently--;

In the Claims:

Column 21, Claim 12, Line 32, please delete “direction” and insert --directions--;

Column 23, Claim 23, Line 65, please delete “cathode” and insert --cathodic--;

Column 25, Claim 29, Line 34, please delete “the” before electrolyte and insert --an--;

UNITED STATES PATENT AND TRADEMARK OFFICE

CERTIFICATE OF CORRECTION

PATENT NO. : RE 40,218 E
APPLICATION NO. : 10/622001
DATED : April 8, 2008
INVENTOR(S) : Landau It is certified that error appears in the above-identified patent and that said Letters Patent is hereby corrected as shown below:

Column 25, Claim 29, Line 46, please delete "in" and insert --to--.

Signed and Sealed this

Eleventh Day of November, 2008

JON W. DUDAS
*Director of the United States Patent and Trademark Office*